United States Patent
Tagami et al.

(10) Patent No.: US 7,443,633 B2
(45) Date of Patent: Oct. 28, 2008

(54) THIN-FILM MAGNETIC HEAD FOR PERPENDICULAR MAGNETIC RECORDING AND MANUFACTURING METHOD OF THIN-FILM MAGNETIC HEAD

(75) Inventors: Katsumichi Tagami, Tokyo (JP); Tatsuya Harada, Tokyo (JP); Hiroki Matsukuma, Tokyo (JP); Tetsuya Roppongi, Tokyo (JP); Susumu Aoki, Tokyo (JP); Kazumasa Fukuda, Tokyo (JP); Naoto Matono, Nagano (JP)

(73) Assignees: TDK Corporation, Tokyo (JP); SAE Magnetics (H.K.) Ltd., Shatin, N.T. (HK)

( * ) Notice: Subject to any disclaimer, the term of this patent is extended or adjusted under 35 U.S.C. 154(b) by 407 days.

(21) Appl. No.: 11/300,277

(22) Filed: Dec. 15, 2005

(65) Prior Publication Data
US 2006/0132972 A1   Jun. 22, 2006

(30) Foreign Application Priority Data
Dec. 17, 2004  (JP) ............................. 2004-366222
Aug. 19, 2005  (JP) ............................. 2005-238612

(51) Int. Cl.
*G11B 5/127*  (2006.01)
(52) U.S. Cl. .................................................. 360/125.5
(58) Field of Classification Search ............... 360/125.5, 360/125.12, 125.51, 317, 318
See application file for complete search history.

(56) References Cited

U.S. PATENT DOCUMENTS 5,774,308 A * 6/1998 Ohtsuka et al. .......... 360/125.5
6,178,065 B1 * 1/2001 Terunuma et al. ....... 360/125.51
6,233,116 B1 * 5/2001 Chen et al. ............... 360/125.5
6,233,125 B1 * 5/2001 Knapp et al. ................ 360/317
6,741,421 B2   5/2004 Mochizuki et al.
7,057,853 B2 * 6/2006 Okada et al. ............ 360/125.12
7,227,720 B2 * 6/2007 Sasaki et al. ........... 360/125.12

FOREIGN PATENT DOCUMENTS

| JP | 10-188222    | 7/1998  |
|----|--------------|---------|
| JP | 10-255229    | 9/1998  |
| JP | 2002-92820   | 3/2002  |
| JP | 2002-133608  | 5/2002  |
| JP | 2002-197610  | 7/2002  |
| JP | 2002-279606  | 9/2002  |
| JP | 2004-281017  | 10/2004 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

A thin-film magnetic head with which an error rate is decreased due to a reduction of a jitter without significant decrease in write field, is provided. The head comprises at least one inductive write head element comprising: a main magnetic pole layer having an inner saturation magnetic flux density varying from both side end surfaces in a track-width direction and a leading end surface, toward a center portion in the track-width direction of a trailing end surface; an auxiliary magnetic pole layer; and at least one coil layer, a curvature width $W_C$ of a contour line of a write field adjacent to a trailing edge on an ABS side of the main magnetic pole layer satisfying the following expression: $-0.15*W_T \leq W_C < 12$ where $W_T$ is a track width and a unit of $W_C$ and $W_T$ is nanometer.

42 Claims, 22 Drawing Sheets

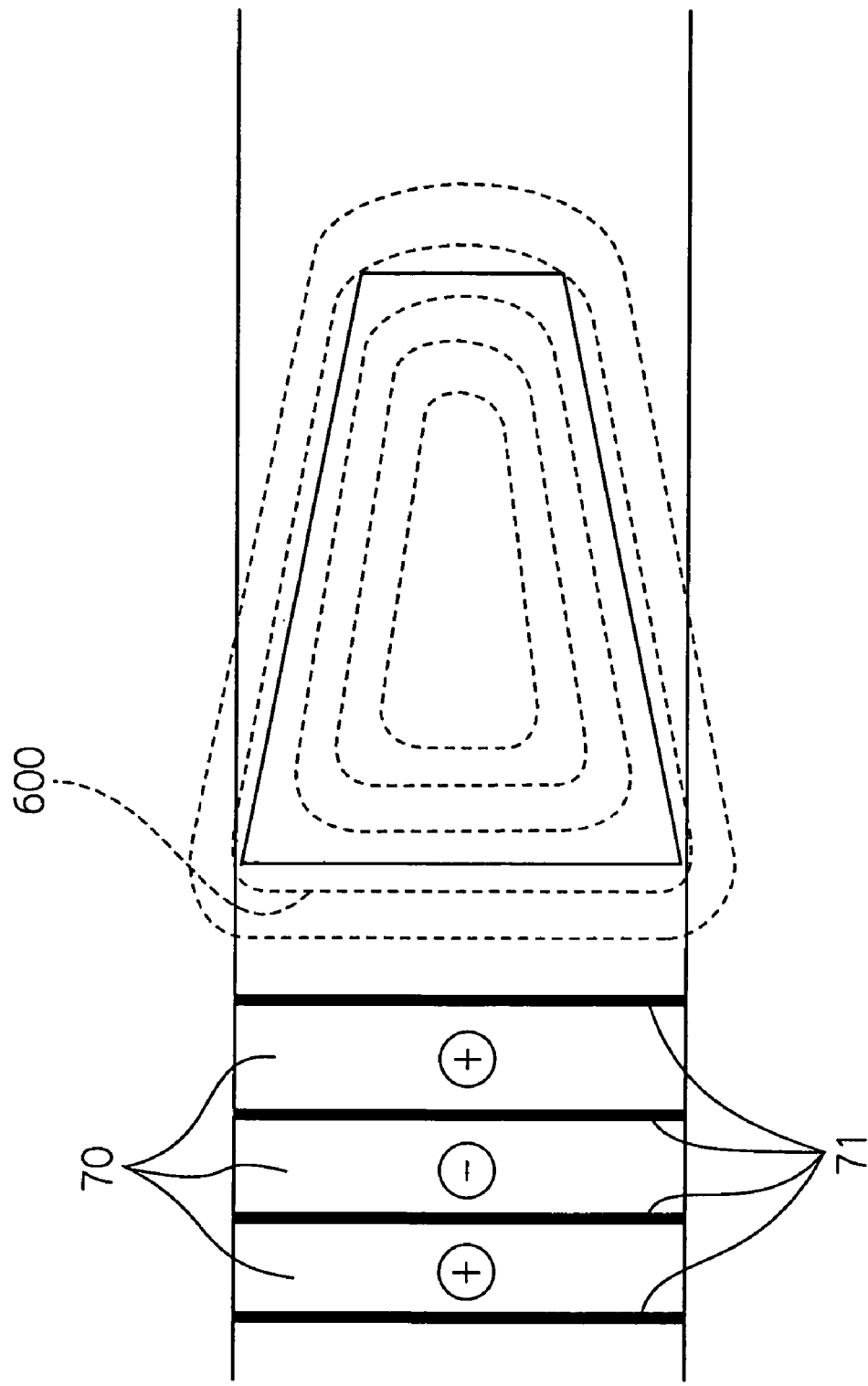

$B_{S1} > B_{S3} > B_{S4} > B_{S2}$

THIN-FILM MAGNETIC HEAD FOR PERPENDICULAR MAGNETIC RECORDING AND MANUFACTURING METHOD OF THIN-FILM MAGNETIC HEAD

PRIORITY CLAIM

This application claims priorities from Japanese patent application No. 2004-366222, filed on Dec. 17, 2004 and Japanese patent application No. 2005-238612, filed on Aug. 19, 2005, which are incorporated herein by reference.

BACKGROUND OF THE INVENTION

1. Field of the Invention

The present invention relates to a thin-film magnetic head for reading and writing signals by means of a perpendicular magnetic recording, a head gimbal assembly (HGA) with the thin-film magnetic head and a magnetic disk drive apparatus with the HGA, and to a manufacturing method of the thin-film magnetic head for the perpendicular magnetic recording.

2. Description of the Related Art

In recent years, the perpendicular magnetic recording has been actively developed instead of conventional longitudinal magnetic recording to realize more improvement in areal recording density of the magnetic disk drive apparatus.

In the perpendicular magnetic recording, a demagnetization field drastically decreases in a magnetization transition region, and therefore, the magnetization transition width can become much smaller than that of the longitudinal magnetic recording. Furthermore, the perpendicularly recorded magnetization is not greatly affected by a thermal fluctuation that becomes serious problem in the longitudinal magnetic recording with higher recording density. Therefore, it becomes possible to obtain stable higher-density recording in the perpendicular magnetic recording.

A thin-film magnetic head for the perpendicular magnetic recording has been proposed, which has a single pole structure including a main magnetic pole, an auxiliary magnetic pole as a return yoke, and an inductive coil inducing a magnetic flux in these magnetic poles. Generally, the magnetic head also has magnetic shields provided in the leading and/or trailing sides of the main magnetic pole. As the same time, a magnetic disk has been proposed which has a multilayer structure of a soft-magnetic backing layer acting as a part of a magnetic circuit and a perpendicular magnetic recording layer.

In the thin-film magnetic head, a field generated from the main magnetic pole performs writing to the magnetic disk. FIG. 1 shows a schematic drawing illustrating a simulated distribution of a magnetic field generated from the conventional main magnetic pole, and recorded bits. In the figure, only the magnetic field generated from the main magnetic pole 10 is illustrated. The cross-section of the main magnetic pole 10 has a trapezoid shape due to the formation of bevel angles against a skew angle arising from an arm driving by means of a rotary actuator, which possibly causes unnecessary signals to be recorded on adjacent tracks. Broken lines show magnetic field contour lines.

As shown in FIG. 1, the contours of the magnetic field generated from the main magnetic pole 10 has a curvature in such a way as to surround the main magnetic pole 10 itself. Recorded bits 11 are formed on the magnetic disk along the contour line that lies in the trailing side, that is, in the downstream side of the disk rotation, and is equivalent to a coercive force of the magnetic disk. As a result, the shape of the magnetization transition region 12 as a boundary region between recorded bits 11 also has a curvature. Therefore, when a magnetoresistive (MR) read head element reads signal fields generated from the recorded bits 11 with the curved transition regions 12, a jitter becomes larger due to the increase in a reverse width of a reproduction power, and the larger jitter causes an error rate to be increased. Moreover, the length of the recorded bit 11 can not be shorten down to the curvature width $W_{TC}$ of the transition region 12, which hinders higher recording density.

As a technique improving the magnetization transition region, for example, a structure that an opposed portion of the auxiliary magnetic pole to the main magnetic pole is protruded in order to suppress the broadening of a magnetic field distribution at track edges, is described in Japanese Patent Publication No. 2002-092820A, in which no curvature of the magnetic field is mentioned. Further, in U.S. patent application Ser. No. 10/880,509, it is described that the main magnetic pole has a double-layered structure of the first layer formed of, for example, CoFe and the second layer formed of, for example, NiFe, CoNiFe or CoFe, though not to improve the magnetization transition region. Furthermore, a structure of the main magnetic pole that has a concave portion in the trailing side of an air bearing surface (ABS) in order to reduce the degree of the curvature of the transition region, is described in U.S. Pat. No. 6,741,421.

However, the structure with the protrusion described in Japanese Patent Publication No. 2002-092820A is not adequate to control the degree of the curvature. The structure is just for suppressing the broadening of the magnetic field distribution and concentrating the magnetic field, and can not positively control the curvature. Further, the double-layered structure described in U.S. patent application Ser. No. 10/880, 509 has no purpose of improving the transition region. Actually, there is no specification about the thickness of each layer in the description, and mere double-layered structure itself can not realize the desired degree of the curvature.

Furthermore, the structure with the concave portion described in U.S. Pat. No. 6,741,421 has a difficulty in forming the concave portion with high accuracy. In other words, the size and depth of the concave portion can not be precisely controlled because the concave portion is formed by digging the magnetic material layer with ion-milling method and so on. However, the degree of the curvature of the magnetic contour, which determines the shape of the magnetization transition region, is sensitive to the shape of the concave portion. Therefore, the contour with small curvature can not be obtained stably.

Furthermore, because a non-magnetic material is embedded in the concave portion, an adequate write field is difficult to be obtained near the trailing edge of the main magnetic pole, which is a main portion for writing, compared to the case without the concave portion.

Moreover, in an MR read head element utilizing giant magnetoresistive (GMR) effect or tunnel magnetoresistive (TMR) effect, a pinned layer, a separation layer and a free layer, which are main components, are usually stacked sequentially on a hard-bias layer. Therefore, in some cases, the free layer that receives signal fields has a curvature with a reverse direction to that of the curvature of the transition region. On this case, a magnetic sensitivity contour that expresses a sensitivity level to a magnetic field of the MR read head element also has a curvature with the reverse direction to that of the curvature of the transition region. As a result, a jitter becomes larger due to the increase in the reverse width of the reproduction power, and the larger jitter causes the error rate to be increased.

Therefore, only reducing the degree of the curvature of the magnetic field contour is not sufficient, and it is needed to design the magnetic field contour with wide design range including the direction of the curvature in consideration of the magnetic sensitivity contour of the MR read head element. Without such a design, the error rate can not be sufficiently decreased by reducing the reverse width of the reproduction power.

BRIEF SUMMARY OF THE INVENTION

Therefore, it is an object of the present invention to provide a thin-film magnetic head for perpendicular magnetic recording with which the error rate is decreased due to the reduction of the jitter by controlling the direction and degree of the curvature of the magnetic field contour in the trailing side of the main magnetic pole without significant decrease in the write field, an HGA provided with this thin-film magnetic head and a magnetic disk drive apparatus provided with this HGA.

It is another object of the present invention to provide a manufacturing method for providing the thin-film magnetic head with such excellent properties stably with high accuracy.

Here, some terms will be defined before explaining the present invention. When viewing the slider with the ABS set as a bottom, from the element-formed surface side toward the leading edge, the right and left sides of a component are defined to be "right" and "left" respectively. In the case, a right and left direction corresponds to the track-width direction. And a right or left surface normal to the ABS is defined as a "side end surface". For example, "the side end surface of the main pole center layer" means the side surface in the track-width direction when the end on the ABS side of the main pole center layer is set as a bottom.

Further, in a layered structure of the magnetic head element formed on the element-formed surface, a component that is closer to the element-formed surface than a standard layer is defined to be "below" or "lower" in relation to the standard layer, and a component that is in the stacking direction side of the standard layer is defined to be "above" or "upper" in relation to the standard layer.

Furthermore, a track width $W_T$ is defined as an effective width of a track that is a magnetization pattern on the magnetic disk formed by writing signals. The effective width of the track can be determined by means of a scan in the track-width direction with use of a magnetic force microscope (MFM) and so on.

A curvature width $W_C$ is defined as a distance between a line $X_1X_2$ and the midpoint of the track width on a magnetic field contour line. Here, $X_1$ and $X_2$ are defined as two intersection points between the magnetic field contour line as the transition region of the recorded bits and both side-edges of the track respectively. In this definition, the curvature width $W_C$ is defined to have positive sign when the midpoint on the magnetic field contour line is in the trailing side in relation to the line $X_1X_2$. On the contrary, the sign is defined as negative in the case that the midpoint is in the leading side in relation to the line $X_1X_2$. The curvature width $W_C$ can also be determined with use of the MFM and so on.

In addition, the track width $W_T$ and the curvature width $W_C$ can be determined by means of a simulation of the distribution of the magnetic field contour that corresponds to a coercive force of the magnetic disk near the end portion of the main magnetic pole layer, on the basis of the distribution of the saturation magnetic flux density at the end portion of the main magnetic pole layer.

According to the present invention, a thin-film magnetic head is provided, which comprises at least one inductive write head element comprising a main magnetic pole layer having an inner saturation magnetic flux density varying from both side end surfaces in a track-width direction and a leading end surface of the main magnetic pole layer, toward a center portion in the track-width direction of a trailing end surface of the main magnetic pole layer, for generating a write field; an auxiliary magnetic pole layer having one end portion being adjacent to one end portion of the main magnetic pole layer and the other end portion connected magnetically with the other end portion of the main magnetic pole layer; and at least one coil layer formed in such a way as to pass through between the main magnetic pole layer and the auxiliary magnetic pole layer for inducing a magnetic flux in the main magnetic pole layer and the auxiliary magnetic pole layer, a curvature width $W_C$ of a contour line of the write field adjacent to a trailing edge on an ABS side of the main magnetic pole layer satisfying the following expression: $-0.15*W_T \leq W_C < 12$ where $W_T$ is a track width and a unit of $W_C$ and $W_T$ is nanometer.

In this head, the contour line of the write field preferably has a straight line shape or an almost straight line shape extending in the track-width direction. Preferably, the thin-film magnetic head further comprises an MR read head element for reading signals, and the contour line of the write field has a concave shape that is curved toward a leading side in a center portion in the track-width direction and has a negative curvature width corresponding to a curvature that equals or nearly equals a curvature of a magnetic sensitivity contour of the MR read head element during reading signals.

According to the present invention, a thin-film magnetic head is further provided, which comprises at least one inductive write head element comprising: a main magnetic pole layer having an inner saturation magnetic flux density varying from both side end surfaces in a track-width direction and a leading end surface of the main magnetic pole layer, toward a center portion in the track-width direction of a trailing end surface of the main magnetic pole layer, for generating a write field; an auxiliary magnetic pole layer having one end portion being adjacent to one end portion of the main magnetic pole layer and the other end portion connected magnetically with the other end portion of the main magnetic pole layer; and at least one coil layer formed in such a way as to pass through between the main magnetic pole layer and the auxiliary magnetic pole layer for inducing a magnetic flux in the main magnetic pole layer and the auxiliary magnetic pole layer, a slope $\alpha$ of a regression line obtained by least square method of a distribution of the inner saturation magnetic flux density under a condition that a positive direction of position coordinate is defined as a direction from the both side end surfaces and the leading end surface toward the center portion of the trailing end surface, satisfying the following expression: $-(0.000157*W_T+0.0126) \leq \alpha < 0$ where a unit of $\alpha$ is Tesla/nm, $W_T$ is a track width, and a unit of $W_C$ and $W_T$ is nanometer.

In these above-described heads, the main magnetic pole layer preferably comprises a main pole center layer and at least one main pole soft-magnetic layer that is formed in such a way as to cover both side end surfaces in the track-width direction and a leading end surface of the main pole center layer. In this case, the at least one main pole soft-magnetic layer is preferably a plurality of main pole soft-magnetic layers.

Further, a saturation magnetic flux density of an outmost layer of the at least one main pole soft-magnetic layer is preferably higher than a saturation magnetic flux density of the main pole center layer. Also preferably, a saturation magnetic flux density of any layer of the at least one main pole soft-magnetic layer is equal to or higher than a saturation magnetic flux density of a layer neighboring an inner surface of the any layer.

Furthermore, the at least one main pole soft-magnetic layer and the main pole center layer are preferably stacked from outside in a descending order of the amount of saturation magnetic flux density. It is also preferable that a saturation magnetic flux density of an outmost layer of the at least one main pole soft-magnetic layer is lower than a saturation magnetic flux density of a layer neighboring an inner surface of the outmost layer.

Also preferably, at least one non-magnetic layer is intercalated in at least one interlayer portion respectively in a multilayered structure of the at least one main pole soft-magnetic layer and the main pole center layer.

As an alternative, an inner saturation magnetic flux density of the main magnetic pole layer may be varied continuously from the both side end surfaces and the leading end surface, toward the center portion of the trailing end surface. In the case, it is preferable that the inner saturation magnetic flux density is monotonically decreased continuously from the both side end surfaces and the leading end surface, toward the center portion of the trailing end surface.

Preferably, an end portion on the ABS side of the main magnetic pole layer has a trapezoidal cross-section parallel to the ABS, and a length of a trailing edge of said trapezoidal cross-section becomes longer than a length of a leading edge of the trapezoidal cross-section. Further, the auxiliary magnetic pole layer preferably has a trailing shield portion that is formed in an end portion on the ABS side of the auxiliary magnetic pole layer, opposed to an end portion on the ABS side of the main magnetic pole layer, and has a longer length in stacking direction than a length in stacking direction of the other portion of the auxiliary magnetic pole layer.

According to the present invention, an HGA is further provided, which comprises the above-described thin-film magnetic head and a support structure for supporting the thin-film magnetic head.

According to the present invention, a magnetic disk drive apparatus is further provided, which comprises: at least one above-described HGA; at least one magnetic disk; and a recording/reproducing control means for controlling read and write operations of said thin-film magnetic head to the at least one magnetic disk.

According to the present invention, a manufacturing method of a thin-film magnetic head is further provided, which comprises steps of: forming a patterned resist layer on a non-magnetic layer formed on/above an element-formed surface of a substrate; forming at least one soft-magnetic film to be at least one main pole soft-magnetic layer and a soft-magnetic center film to be a main pole center layer sequentially on the non-magnetic layer and the patterned resist layer; forming a trailing end surface on which edges of the at least one main pole soft-magnetic layer and the main pole center layer are exposed with the main pole center layer as a central part, by using chemical mechanical polishing method and/or ion milling technique; and removing the patterned resist layer to form a main magnetic pole layer.

In this method, a saturation magnetic flux density of each film of the at least one soft-magnetic film and the soft-magnetic center film is preferably set so that a slope $\alpha$ of a regression line obtained by least square method of a distribution of the saturation magnetic flux density, under a condition that a positive direction of position coordinate is defined as a direction from the at least one soft-magnetic film deposited first toward the soft-magnetic center film deposited last, satisfies the following expression: $-(0.000157*W_T+0.0126) \leq \alpha < 0$ where a unit of $\alpha$ is Tesla/nm, $W_T$ is a track width, and a unit of $W_C$ and $W_T$ is nanometer. Further, the at least one soft-magnetic film and the soft-magnetic center film are also preferably deposited from outside in a descending order of the amount of saturation magnetic flux density.

It is further preferable that after forming a base coat layer on the non-magnetic layer and the patterned resist layer, the at least one soft-magnetic film and the soft-magnetic center film are deposited sequentially on the base coat layer.

According to the present invention, a manufacturing method of a thin-film magnetic head is further provided, which comprises steps of: forming a patterned resist layer on a non-magnetic layer formed on/above an element-formed surface of a substrate; forming a soft-magnetic film to be a main magnetic pole layer with an inner saturation magnetic flux density continuously varied by changing deposition conditions continuously during deposition on the non-magnetic layer and the patterned resist layer; forming a trailing end surface on which an edge of the main magnetic pole layer is exposed by using chemical mechanical polishing method and/or ion milling technique; and removing the patterned resist layer to form the main magnetic pole layer.

In this method, the deposition conditions are preferably changed during forming the soft-magnetic film so that a slope $\alpha$ of a regression line obtained by least square method of a distribution of the inner saturation magnetic flux density, under a condition that a positive direction of position coordinate is defined as a direction from both side end surfaces in a track-width direction and a leading end surface of the main magnetic pole layer toward a center portion in the track-width direction of a leading end surface of the main magnetic pole layer, satisfies the following expression: $-(0.000157*W_T+0.0126) \leq \alpha < 0$ where a unit of $\alpha$ is Tesla/nm, $W_T$ is a track width, and a unit of $W_C$ and $W_T$ is nanometer.

Further, the deposition conditions are also preferably changed during forming said soft-magnetic film so that the inner saturation magnetic flux density of the soft-magnetic film is monotonically decreased continuously.

It is further preferable that after forming a base coat layer on the non-magnetic layer and the patterned resist layer, the soft-magnetic film is deposited on the base coat layer.

The above-described manufacturing methods further preferably comprises steps of: forming a first covering film on the main magnetic pole layer and the non-magnetic layer after forming the main magnetic pole layer; forming a stop film made of a material with low polishing rate in chemical mechanical polishing in a position adjacent to the main magnetic pole layer and closer to an upper surface of the non-magnetic layer than the trailing end surface; forming a second covering film on the first covering film and the stop film; and forming a trailing end surface that is in plane with polished surfaces of the first covering layer and the second covering layer by performing chemical mechanical polishing to a position of the stop film.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 7 shows a schematic drawing illustrating a simulated distribution of the write field generated from the main magnetic pole layer, and recorded bits;

DETAILED DESCRIPTION OF THE INVENTION

Figure 1:
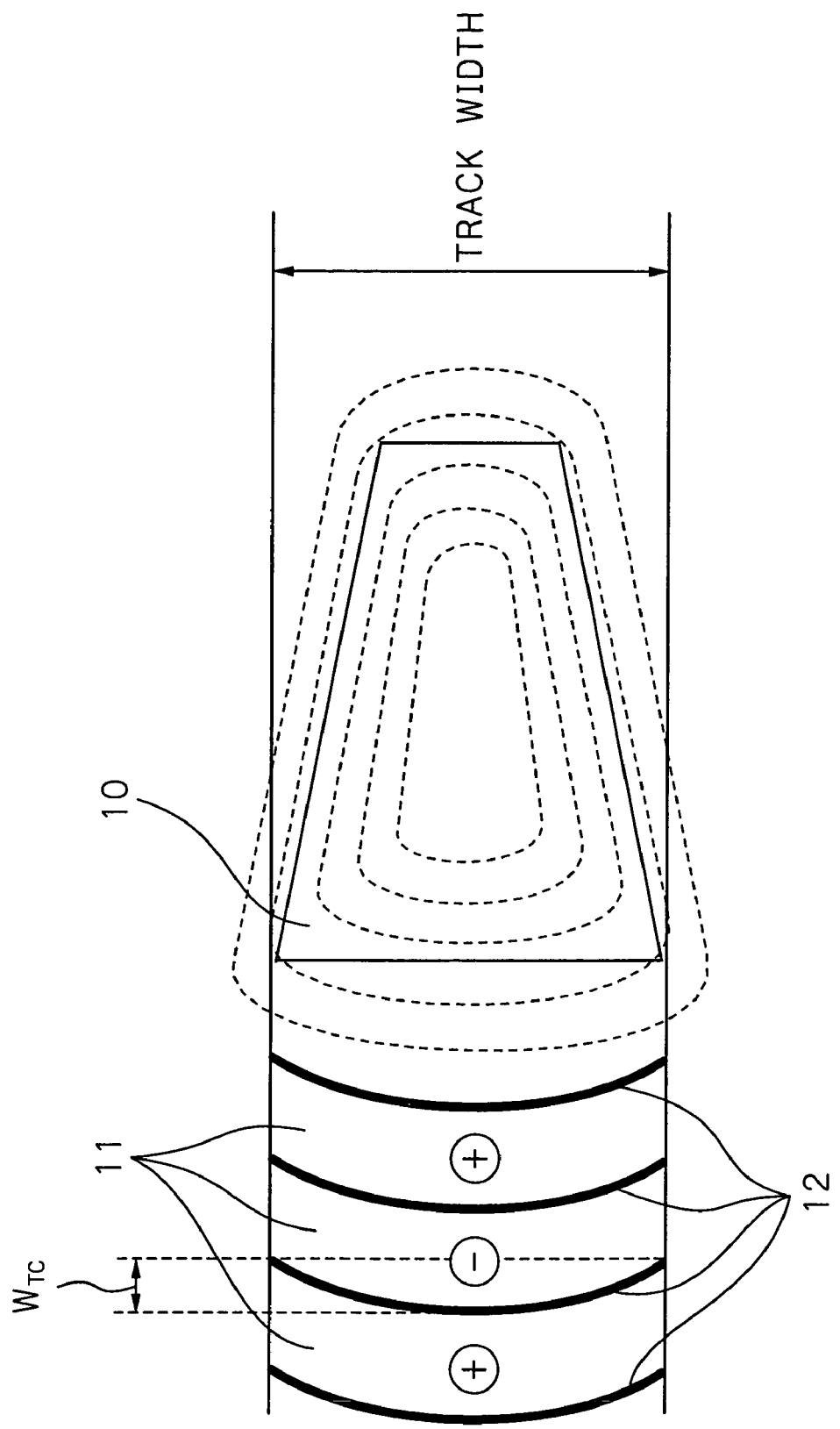
FIG. 1 shows a schematic drawing illustrating a simulated distribution of the magnetic field generated from the conventional main magnetic pole, and recorded bits.
Figure 2:
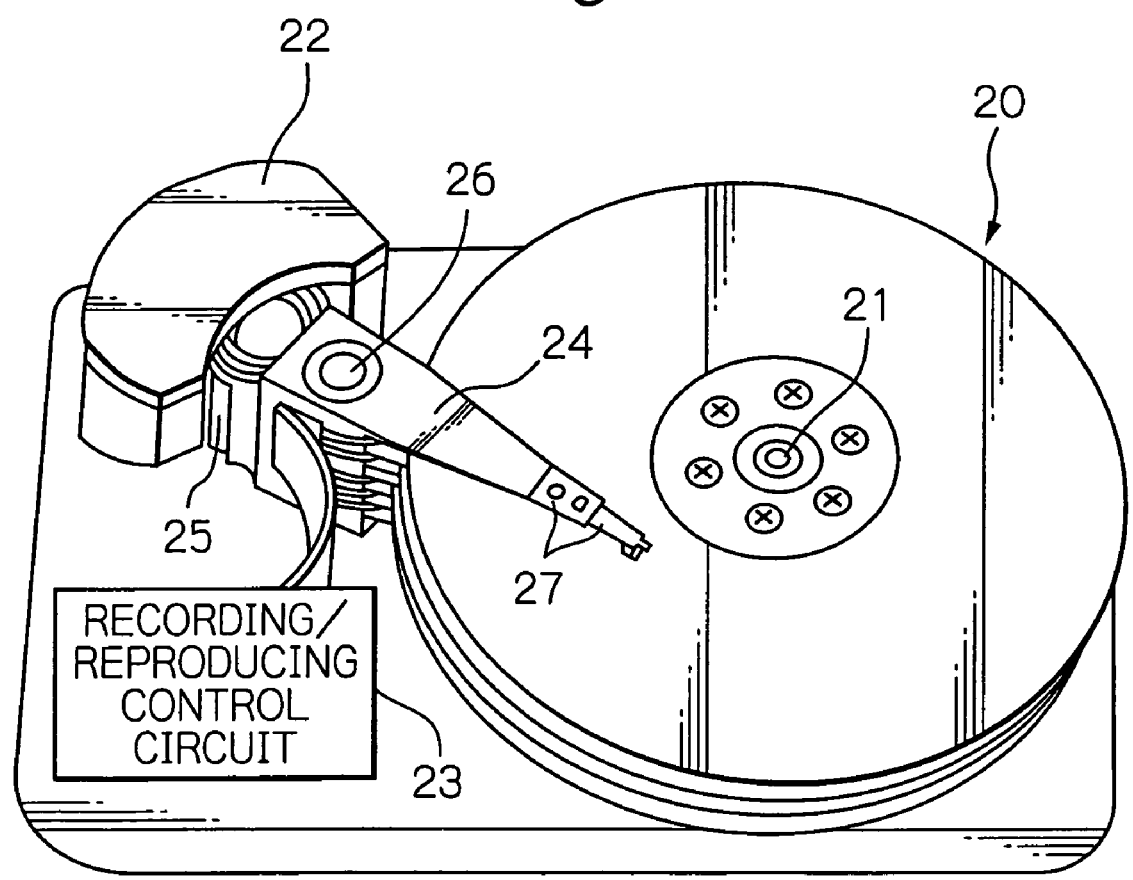
FIG. 2 shows a perspective view schematically illustrating a structure of a main part of an embodiment of a magnetic disk drive apparatus according to the present invention.
Figure 3:
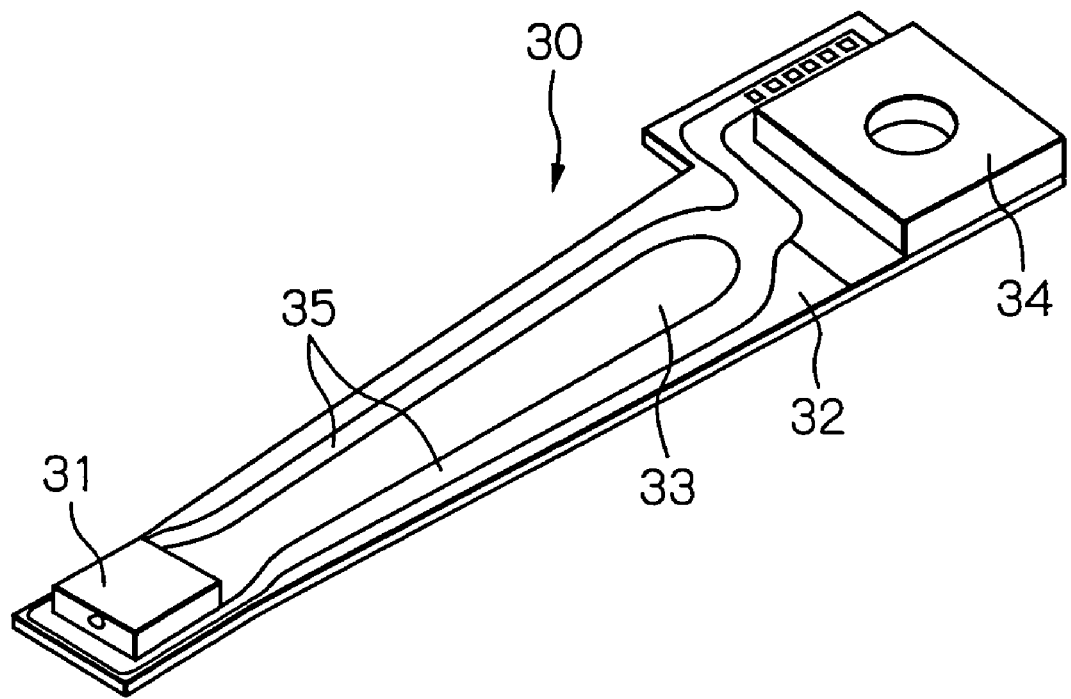
FIG. 3 shows a perspective view illustrating an embodiment of an HGA according to the present invention.
Figure 4:
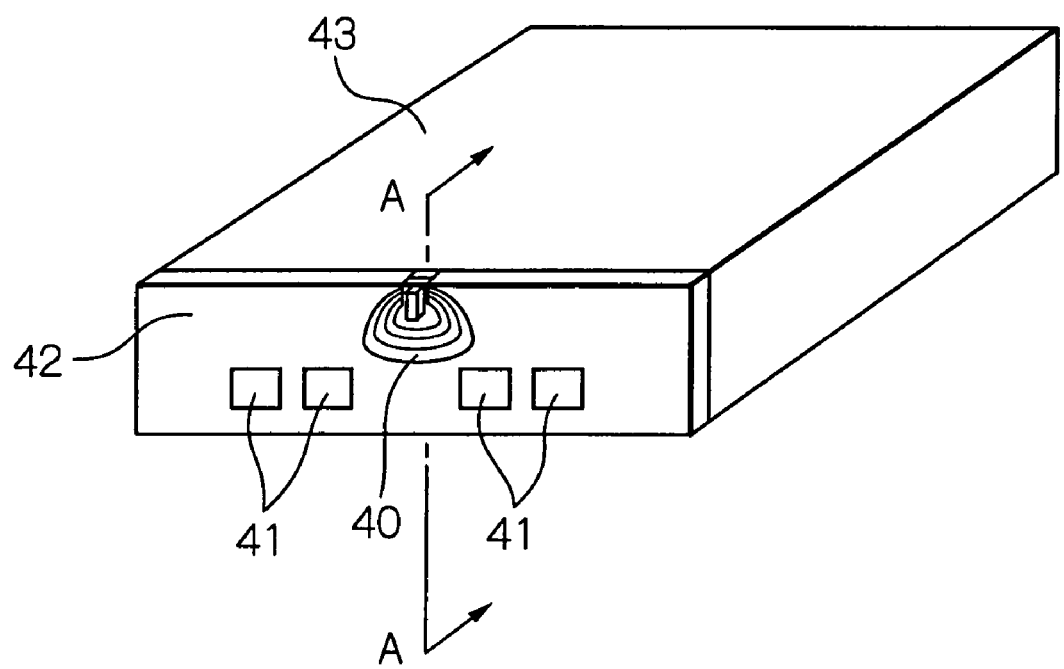
FIG. 4 shows a perspective view of an embodiment of a thin-film magnetic head (slider) for perpendicular magnetic recording provided on the end portion of the HGA.

FIG. 2 shows a perspective view schematically illustrating a structure of a main part of an embodiment of a magnetic disk drive apparatus according to the present invention, FIG. 3 shows a perspective view illustrating an embodiment of an HGA according to the present invention, and FIG. 4 shows a perspective view of an embodiment of a thin-film magnetic head (slider) for perpendicular magnetic recording provided on the end portion of the HGA.

In FIG. 2, reference numeral 20 indicates a plurality of magnetic disks rotating around a rotational axis of a spindle motor 21, 22 indicates an assembly carriage device for positioning a thin-film magnetic head (slider) on a track, and 23 indicates a recording/reproducing control circuit for controlling read/write operations of the thin-film magnetic head, respectively.

The assembly carriage device 22 is provided with a plurality of drive arms 24. These drive arms 24 are rotatable around a pivot bearing axis 26 by means of a voice coil motor (VCM) 25 and stacked in the direction along this axis 26. An HGA 27 is provided on the end portion of each drive arm 24. A slider is mounted on each HGA 27 in such a way as to face the surface of each magnetic disk 20. The each number of the magnetic disks 20, the drive arms 24, the HGAs 27 and the thin-film magnetic heads (sliders) can also be only one.

As shown in FIG. 3, the HGA is constructed by fixing a slider 31 having a magnetic head element on an end portion of a suspension 30, and by electrically connecting one end of a wiring member 35 to signal electrodes of the slider 31.

The suspension 30 is mainly constructed of a load beam 32, a flexure 33 with elasticity fixed and supported on this load beam 32, a base plate 34 provided on the base portion of the load beam 32, and the wiring member 35 that is made up of trace conductors and connection pads electrically connected to both ends of the trace conductors and is provided on the flexure 33.

It is obvious that the structure of the suspension in the HGA according to the present invention is not limited to the above-described one. Though not shown in the figure, it is also possible to attach a head drive IC chip at some midpoint of the suspension 30.

As shown in FIG. 4, the thin-film magnetic head (slider) according to the present embodiment is provided with a magnetic head element 40 as an inductive write head element and an MR read head element, total of four signal electrodes 41 connected to these elements, all of which are formed on an element-formed surface 42. Reference numeral 43 indicates an ABS of the slider. The number and positions of the electrodes are not limited to the mode in FIG. 4. In the embodiment shown in FIG. 4, there are four electrodes, however it is also possible to provide three electrodes and a ground connecting to the slider substrate.

Figure 5:
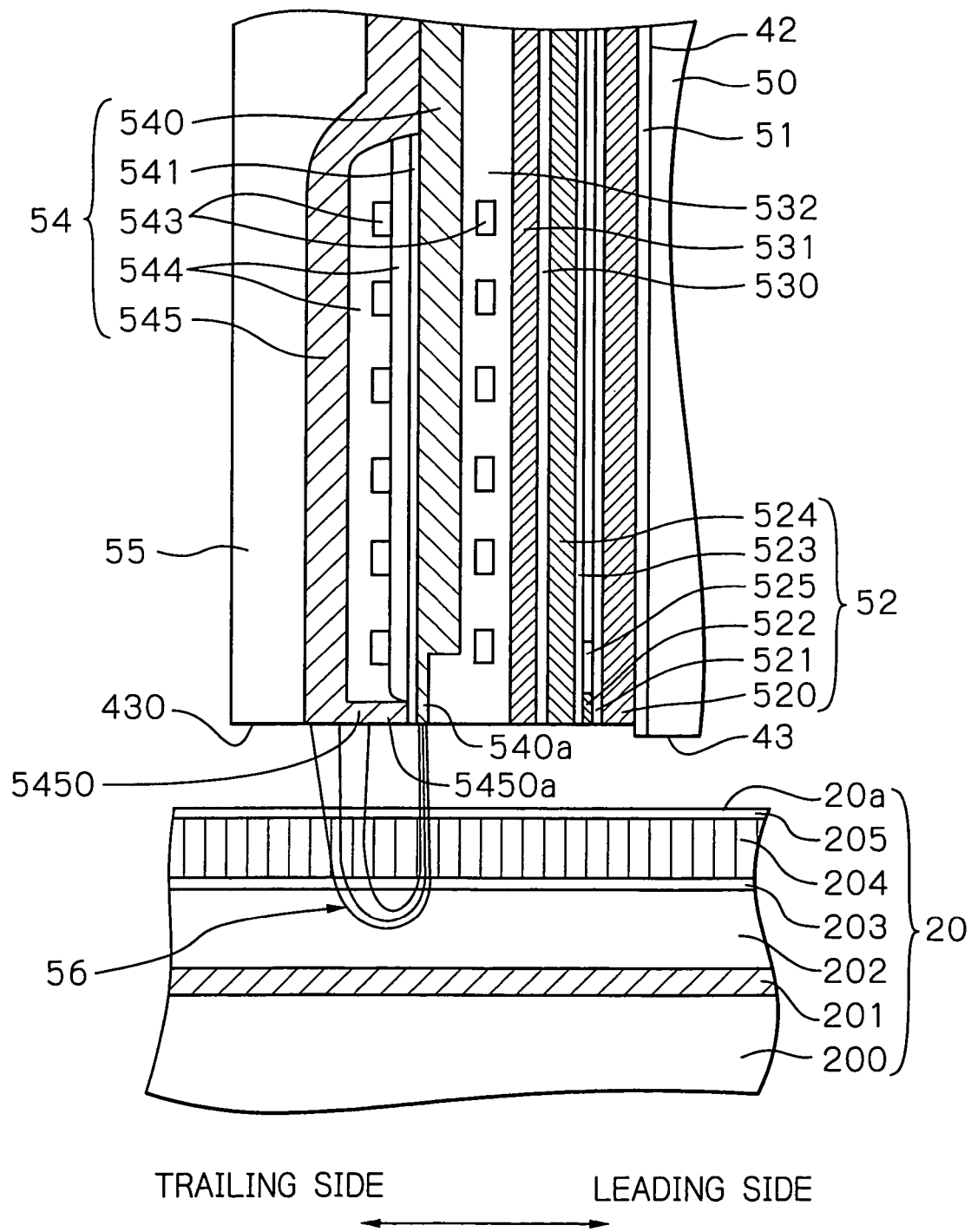
FIG. 5 shows a cross-section view taken along line A-A shown in FIG. 4 illustrating a structure of the thin-film magnetic head according to the embodiment shown in FIG. 4.

FIG. 5 shows a cross-section view taken along line A-A shown in FIG. 4 illustrating a structure of the thin-film magnetic head according to the embodiment shown in FIG. 4. The number of turns of the coil in FIG. 5 is shown as if to be smaller than the actual number of turns for simplicity of drawings. The coil may also be a two-layered coil or a helical coil.

In FIG. 5, the slider substrate 50 has the ABS 43 and flies hydrodynamically over the surface 20a of the rotating magnetic disk 20 with a predetermined space during write and read operations. The MR read head element 52, the inductive write head element 54, a shielding-between-elements layer 531 for magnetically shielding the MR read head element 52 from the inductive write head element 54, and an overcoat layer 55 for protecting the head elements, are formed on the element-formed surface 42 of the slider substrate 50.

The MR read head element 52 includes an MR layer 522, a lower shield layer 520 and an upper shield layer 524 disposed in positions sandwiching the MR layer 522. The MR layer 522 includes a current-in-plane giant magnetoresistive (CIP-GMR) multilayer, a current-perpendicular-to-plane giant magnetoresistive (CPP-GMR) multilayer or a tunnel magnetoresistive (TMR) multilayer and senses magnetic fields corresponding to signals with very high sensitivity.

When the MR layer 522 includes the CIP-GMR multilayer, upper and lower shield gap layers 523 and 521 are provided between the MR layer 522 and the upper and lower shield layers 524 and 520 respectively. The upper and lower shield layers 524 and 520 are soft-magnetic layers and play the role of shielding external magnetic field that causes noise to the MR layer 522. Meanwhile, when the MR layer 522 includes the CPP-GMR multilayer or the TMR multilayer, the upper and lower shield layers 524 and 520 act also as upper and lower electrodes respectively.

The inductive write head element 54 includes a main magnetic pole layer 540, an auxiliary magnetic pole layer 545 and a coil layer 543. The main magnetic pole layer 540 is a magnetic path to converge and guide a magnetic flux induced by the current flowing through the coil layer 543 up to a perpendicularly recording layer 204 of the magnetic disk 20 on which data is to be recorded. The coil layer 543 may also be one layer that passes through only between the main magnetic pole layer 540 and the auxiliary magnetic pole layer 545. The end portion 540a of the main magnetic pole layer 540 on the side of the head end surface 430 has a smaller thickness in the stacking direction compared to the other portions, and therefore can generate sufficiently fine write field for higher density recording. A magnetic field adjacent to the trailing edge of the end portion 540a is mainly used for writing to the perpendicularly recording layer 204.

The main magnetic pole layer 540 has a designed multilayer structure including a plurality of soft-magnetic layers. The write field contour adjacent to the trailing edge of the end portion 540a has an almost straight-line shape extending in the track-width direction, or a concave shape in which the center portion is curved toward the leading side. The shape of the contour can be controlled in the range of a line and curves with various curvatures by changing the multilayered structure of the main magnetic pole layer 540. The multilayered structure will be described later in detail.

A trailing shield portion 5450 of the auxiliary magnetic pole layer 545 receives a magnetic flux 56 that passes through the perpendicular recording layer 204 from the main magnetic pole layer 540 with extremely high flux density, and then is returned through a soft-magnetic backing layer 202, spreading up to rather low flux density. Further, the main magnetic pole layer 540 and the auxiliary magnetic pole layer 545 have a back gap portion in the region opposite to the head end surface 430, and are coupled magnetically in the back gap portion. In other words, the two pole layers constitute a circular magnetic path.

Here, the trailing shield portion 5450 causes a magnetic field gradient between the end portion 5450a of the trailing shield portion 5450 and the end portion 540a of the main magnetic pole layer 540 to be much steeper. As a result, the jitter becomes smaller due to the decrease in the width of the magnetization transition region between write bits, and the smaller jitter causes an error rate to be decreased.

The respective ends of the main magnetic pole layer 540 and the trailing shield portion 5450 facing the magnetic disk surface extend to the head end surface 430. The head end surface 430 is coated with diamond like carbon (DLC) and so on as a protective film.

The magnetic disk 20 has a multilayered structure that a magnetization-aligning layer 201, a soft-magnetic backing layer 202 acting as a part of magnetic paths, an intermediate layer 203, a perpendicularly recording layer 204 and a protecting layer 205 are sequentially stacked in this order on a substrate 200. The magnetization-aligning layer 201 stabilizes magnetic domains of the soft-magnetic backing layer 202 by applying anisotropic magnetic fields in the track-width direction thereto. The intermediate layer 203 acts as a base coat for adjusting the magnetic alignment and the grain size of the perpendicularly recording layer 204.

Next, the above-mentioned structure will be explained in more detail with FIG. 5. The slider substrate 50 is made of, for example, AlTiC ($Al_2O_3$—TiC) and so on. Reference numeral 51 indicates an insulating layer with thickness of approximately 0.05 μm to 10 μm formed of, for example, $Al_2O_3$, etc., deposited on the slider substrate 50. The lower shield layer 520 is deposited on the insulating layer 51 and formed of, for example, NiFe, NiFeCo, CoFe, FeN or FeZrN, etc. with thickness of approximately 0.3 μm to 3 μm. Reference numeral 521 indicates a lower shield gap layer with thickness of approximately 0.005 μm to 0.5 μm formed of, for example, $Al_2O_3$ or DLC, etc., deposited on the lower shield layer 520.

The MR layer 522 is made of, for example, the CIP-GMR multilayer, the CPP-GMR multilayer or the TMR multilayer. Reference numeral 525 indicates an element lead conductor layer connected to both ends of the MR layer 522, formed of, for example, Cu, etc. and provided with a magnetic bias layer, and 523 indicates an upper shield gap layer with thickness of approximately 0.005 μm to 0.5 μm formed of, for example, $Al_2O_3$ or DLC, etc., deposited on the MR layer 522 and element lead conductor layer 525. In the case that the MR layer 522 is made of the CPP-GMR multilayer or the TMR multilayer, the upper and lower shield gap layers 523 and 521 and the element lead conductor layer 525 become unnecessary. The upper shield layer 524 is deposited on the upper shield gap layer 523 and formed of, for example, NiFe, NiFeCo, CoFe, FeN or FeZrN, etc. with thickness of approximately 0.3 μm to 4 μm. A reproducing gap length that is the distance between the upper and lower shield layers 524 and 520 is approximately 0.03 μm to 1 μm.

Reference numeral 530 indicates a lower non-magnetic layer with thickness of approximately 0.1 μm to 2.0 μm formed of, for example, $Al_2O_3$, etc., deposited on the upper shield layer 524. The shielding-between-elements layer 531 is formed of, for example, NiFe, NiFeCo, CoFe, FeN or FeZrN, etc. with thickness of approximately 0.3 μm to 4 μm, and deposited on the lower non-magnetic layer 530. Reference numeral 532 indicates an intermediate non-magnetic layer with thickness of approximately 0.7 μm to 2.0 μm formed of, for example, $Al_2O_3$, etc., deposited on the shielding-between-elements layer 531. In the intermediate non-magnetic layer 532, a part of the coil layer 543 is formed, and the upper layer of the intermediate non-magnetic layer 532 is planarized by chemical mechanical polishing (CMP) method and so on. When one magnetic layer is formed instead of the upper shield layer 524 and the shielding-between-elements layer 531, which serves as these layers, the lower non-magnetic layer 530 is omitted.

The main magnetic pole layer 540 is deposited on the intermediate non-magnetic layer 532, and has a multilayered structure including a plurality of alloy layers made from two or three elements of a group consisting of Ni, Fe and Co, or the alloy layers made from the above two or three elements to which at least one appropriate element is added, with thickness of approximately 0.01 µm to 0.5 µm in the end portion on the ABS side and approximately 0.5 µm to 3.0 µm in the other portions. A more specific structure of the main magnetic pole layer 540 will be described later in detail.

Reference numeral 541 indicates a magnetic gap layer with thickness of approximately 0.01 µm to 0.5 µm, formed of, for example, $Al_2O_3$ or DLC, etc., deposited on the main magnetic pole layer 540. The thickness of the magnetic gap layer 541 provides a gap length of the trailing shield portion formed between the end portion 540a of the main magnetic pole layer 540 and the end portion 5450a of the trailing shield portion 5450. Reference numeral 544 indicates a coil insulating layer with thickness of approximately 0.1 µm to 5 µm, formed of, for example, a heat-cured resist and so on. The coil layer 543 is provided on the coil insulating layer 544 and in the intermediate non-magnetic layer 532, and formed of, for example, Cu, etc. with thickness of approximately 0.5 µm to 3 µm. The auxiliary magnetic pole layer 545 is made from two or three elements of a group consisting of Ni, Fe and Co, or is made from the above two or three elements to which at least one appropriate element is added, with thickness of approximately 0.5 µm to 5 µm. The Reference numeral 55 indicates an overcoat layer formed of, for example, $Al_2O_3$ and so on.

Figure 6A:
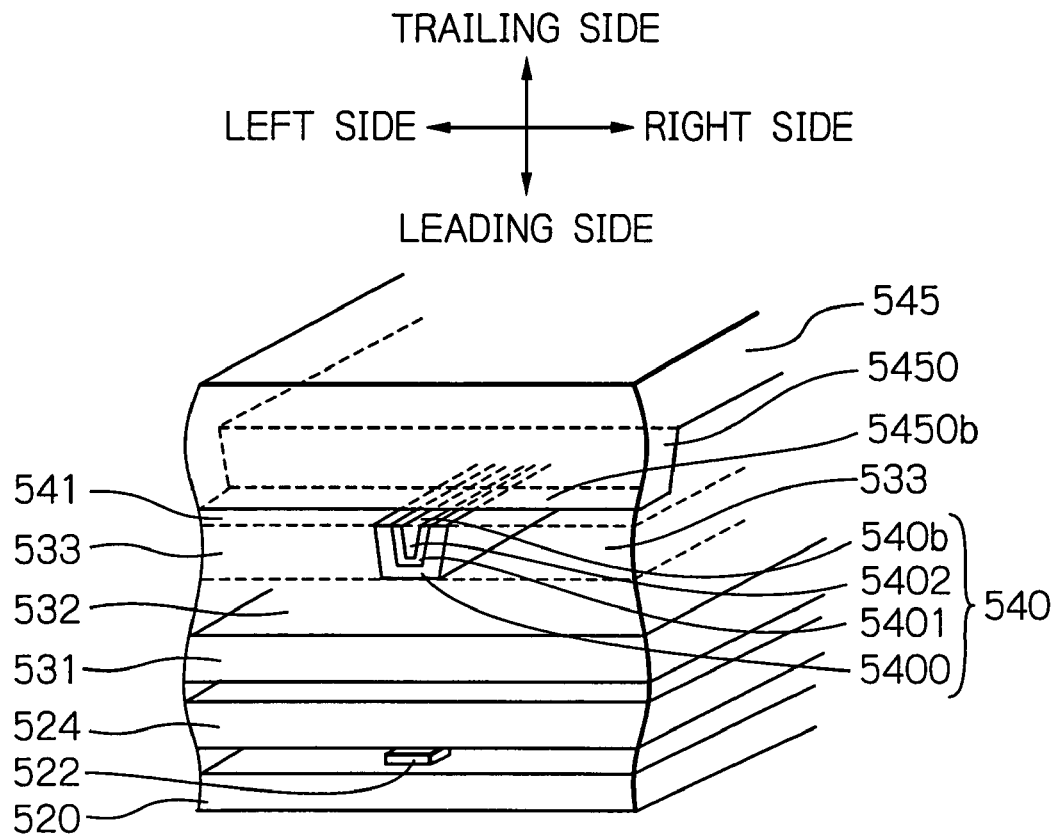
FIG. 6a shows a perspective view from the ABS side illustrating a structure of the thin-film magnetic head according to the embodiment shown in FIG. 4.
Figure 6B:
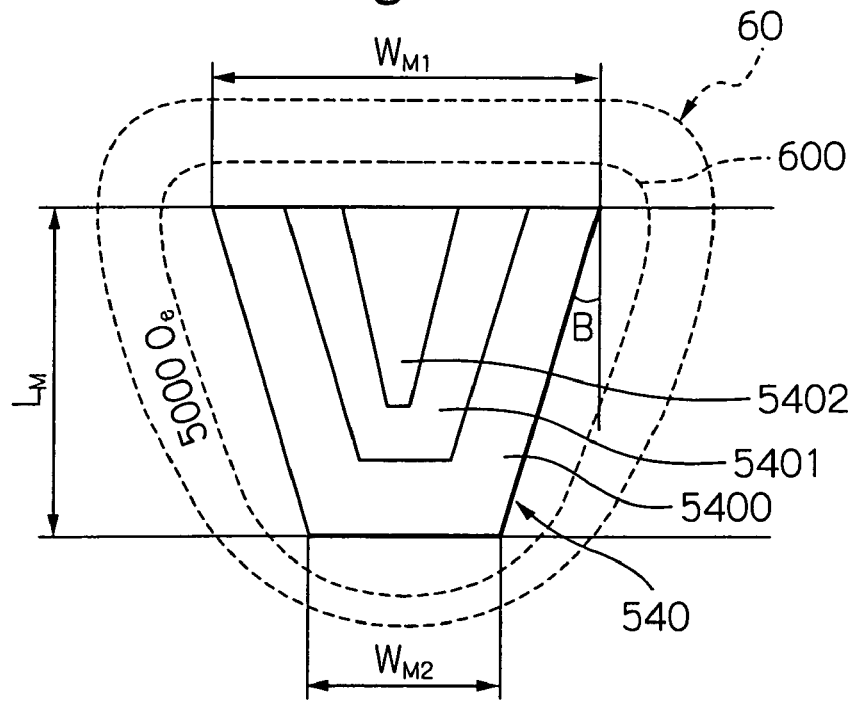
FIG. 6b shows a cross-sectional view illustrating a structure of the main magnetic pole layer.

FIG. 6a shows a perspective view from the ABS side illustrating a structure of the thin-film magnetic head according to the embodiment shown in FIG. 4, and FIG. 6b shows a cross-sectional view illustrating a structure of the main magnetic pole layer 540.

According to FIG. 6a, the main magnetic pole layer 540 has a trapezoidal cross-section parallel to the ABS, and the length of the trailing edge becomes longer than that of the leading edge. The trailing end surface 540b is opposed to a leading end surface 5450b of the trailing shield portion 5450, and the opposed end surfaces form a trailing shield gap.

The main magnetic pole layer 540 includes a main pole center layer 5402 and two main pole soft-magnetic layers 5400 and 5401 that are formed in such a way as to cover the right and left side end surfaces and the leading end surface of the main pole center layer 5402 except the trailing end surface 540b. The main pole soft-magnetic layer 5400 that is positioned on the outmost side is defined as a first main pole soft-magnetic layer, and the main pole soft-magnetic layer 5401 that is positioned on the immediately inner side is defined as a second main pole soft-magnetic layer. In other words, the main magnetic pole layer 540 has a three-layered structure in which the main pole center layer 5402 is centered. As a result, on the trailing end surface around which the write field is mainly generated, edges of the main pole center layer 5402 and the first and second main pole soft-magnetic layers 5400 and 5401 are exposed, and therefore, by adjusting the thicknesses and saturation magnetic flux densities of these edge-exposed layers, the distribution of the write field can be controlled.

Furthermore, the upper non-magnetic layer 533 is provided on both sides in the track-width direction of the main magnetic pole layer 540, formed of, for example, $Al_2O_3$ and so on. Therefore, when viewing from the ABS side, all the edges of the magnetic pole layer 540 are surrounded by non-magnetic materials, and magnetically isolated.

A base coat layer, formed of Ta, etc., may also be provided on both sides in the track-width direction and on the trailing side of the main magnetic pole layer 540, that is to say, between the main magnetic pole layer 540 and respective upper and intermediate non-magnetic layers 533 and 532.

According to FIG. 6b, in the main magnetic pole layer 540, the length $W_{M1}$ of the trailing edge as a longer edge of trapezoid is, for example, 120 nm, the length $W_{M2}$ of the leading edge as a shorter edge of trapezoid is, for example, 66.7 nm, the distance $L_M$ between the trailing and leading edges as a height of trapezoid is, for example, 140 nm. The bevel angle B for preventing writing to adjacent tracks due to influence of the skew angle is, for example, 15 degree. The first and second main pole soft-magnetic layers 5400 and 5401 are formed of an alloy made from two or three elements of a group consisting of Ni, Fe and Co, or an alloy made from the above two or three elements to which at least one element of a group consisting of B, C, N, Al, Si, Cu, Zr, Hf, Ta, Ti, Mg, Mn, Nb, Mo, V and Cr is added. The main pole center layer 5402 is also formed of the same kind of alloy.

The respective saturation magnetic flux densities $B_{S1}$, $B_{S2}$ and $B_{S3}$ of the first and second main pole soft-magnetic layers 5400 and 5401 and the main pole center layer 5402, have a relation of $B_{S1} > B_{S2} > B_{S3}$. For example, the values of $B_{S1}$, $B_{S2}$ and $B_{S3}$ are 2.2 tesla (T), 2.0 T and 1.5 T respectively. When Fe is mainly contained as a constituent element of these layers, the saturation magnetic flux density can be controlled by changing mainly the Fe composition ratio. When Fe is not or mainly not contended, it can be also controlled by changing mainly Ni or Co composition ratio.

A magnetic field contour line 600 of the write field 60 generated from the main magnetic pole layer 540, which corresponds to the coercive force of the magnetic disk, for example, 5000 Oe (398 kA/m), has almost a straight line shape extending in the track-width direction near the trailing edge of the main magnetic pole layer 540. In the conventional monolayered main magnetic pole layer, a magnetic field contour line has a shape curved toward the trailing side near the center portion of the trailing edge. On the contrary, in the present embodiment, the distribution of the saturation magnetic flux density that decreases toward the center portion of the trailing edge suppresses the curvature of the magnetic field contour line. Furthermore, the shape of the magnetic field contour line 600 can be flexibly designed by changing the thicknesses and the saturation magnetic flux densities of the main pole soft-magnetic layers and the main pole center layer as parameters. In other words, controlling three-layered structures of the main magnetic pole layer 540 can cause the magnetic field contour line 600 to become a curve with various curvatures or a straight line.

In the present embodiment, it is easy to design the magnetic field contour because many parameters are available due to the three-layered structure. However, even in the doublelayered structure of one single main pole soft-magnetic layer and one main pole center layer, it is also possible to provide the magnetic field contour having a curve with various curvatures or a straight line.

FIG. 7 shows a schematic view illustrating a simulated distribution of the write field generated from the main magnetic pole layer 540, and recorded bits.

As described above, because the magnetic field contour line 600 corresponding to the coercive force of the magnetic disk has a straight line shape, recorded bits 70 having edges along the straight line is formed on the magnetic disk. As a result, magnetization transition regions 71 as boundaries of recorded bits 70 also have the same straight line shape. In this case, when signal fields generated from the recorded bits 70 are read by the MR read head element, a jitter becomes smaller due to the decrease in the reverse width of the production power, and the smaller jitter can cause an error rate to be decreased. Moreover, the significantly small curvature of the magnetization transition region causes the write bit length to be much smaller, and therefore, contributes higher-density recording.

FIGS. 8*a* to 8*d* show cross-sectional views illustrating various embodiments in the structure of the main magnetic pole layer.

Figure 8A:
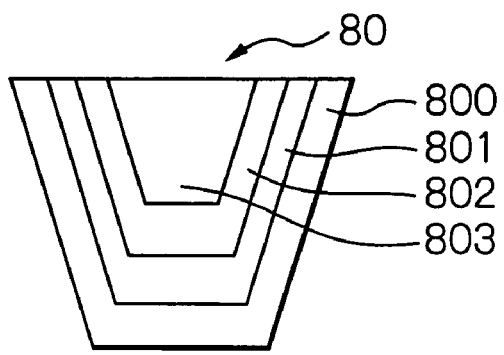
FIGS. 8a to 8d show cross-sectional views illustrating various embodiments in the structure of the main magnetic pole layer.

According to FIG. 8*a*, a main magnetic pole layer 80 has a four-layered structure in which a first main pole soft-magnetic layer 800, a second main pole soft-magnetic layer 801, a third main pole soft-magnetic layer 802 and a main pole center layer 803 are stacked sequentially in this order. The respective saturation magnetic flux densities $B_{S800}$, $B_{S801}$, $B_{S802}$ and $B_{S803}$ of the layers 800, 801, 802 and 803 have relations monotonically decreasing in this order, that is to say, of $B_{S800} \geq B_{S801} \geq B_{S802} \geq B_{S803}$ (except for the relations that $B_{S800}=B_{S801}=B_{S802}=B_{S803}$). Even when a main magnetic pole layer has a three-layered or more-than-four-layered structure and the same relations between the respective saturation magnetic flux densities of the constitutive layers, the structure of the main magnetic pole layer is within the scope of the present invention.

In these multilayered structures, controlling the respective thicknesses and saturation magnetic flux densities of the constituent layers as parameters can cause the magnetic field contour line to become a curve with various curvatures or a straight line. It is easier to design various magnetic field contours because more parameters are available due to the more-than-three-layered structure. Furthermore, in the case designing the straight line shape, it is possible to obtain a straight line with higher linearity.

Figure 8B:
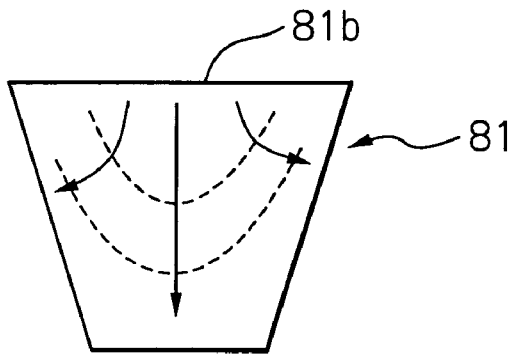

According to FIG. 8*b*, a main magnetic pole layer 81 has a structure in which the saturation magnetic flux density $B_{S81}$ is continuously decreased from the side end surfaces in the track-width direction and the leading end surface toward the center portion in the track-width direction of the trailing end surface 81*b*. In the main magnetic pole layer 81, controlling the distribution of the saturation magnetic flux density $B_{S81}$ can cause the magnetic field contour line to become a curve with various curvatures or a straight line. The distribution of the saturation magnetic flux density $B_{S81}$ does not necessarily need to be decreased monotonically. Under the condition that the positive direction of position coordinate is defined as a direction from the side end surfaces in the track-width direction and the leading end surface toward the center portion in the track-width direction of the trailing end surface 81*b*, when the regression line of the $B_{S81}$ distribution obtained by least square method has a negative slope, the saturation magnetic flux density $B_{S81}$ is decreased on average, and the above-described magnetic field contour line can be designed.

Figure 8C:
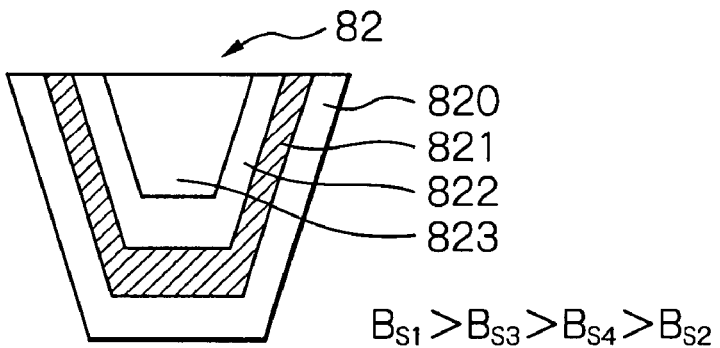

According to FIG. 8*c*, a main magnetic pole layer 82 has a four-layered structure as well as the main magnetic pole layer 80 shown in FIG. 8*a*, in which a first main pole soft-magnetic layer 820, a second main pole soft-magnetic layer 821, a third main pole soft-magnetic layer 822 and a main pole center layer 823 are stacked sequentially in this order. However, the respective saturation magnetic flux densities $B_{S820}$, $B_{S821}$, $B_{S822}$ and $B_{S823}$ of the layers 820, 821, 822 and 823 have relations of $B_{S820} > B_{S822} > B_{S823} > B_{S821}$. In other words, the saturation magnetic flux density has a tendency to be decreased from outer layer toward inner layer where the regression line of the distribution has a negative slope, however the $B_{S821}$ deviates from the tendency, that is, becomes smaller than the $B_{S823}$. In this embodiment, the magnetic field contour line can also be designed to become a curve with various curvatures or a straight line by controlling the distribution.

Because the $B_{S820}$ of the outmost layer 820 is larger than the $B_{S23}$ of the inner center layer 823, it is rather easy to provide the tendency to be decreased toward the inner center layer on average. The above-mentioned regression line obtained by least square method will be explained later in detail.

Figure 8D:
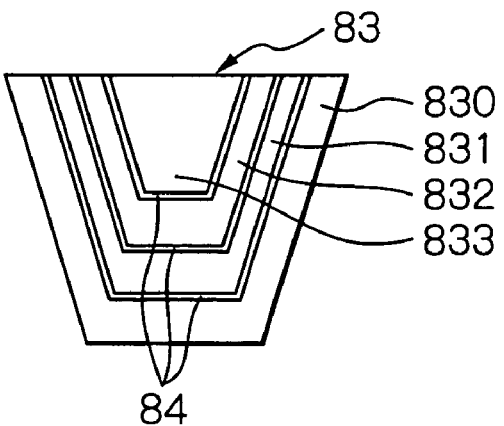

According to FIG. 8*d*, a main magnetic pole layer 83 has a multilayered structure in which a first main pole soft-magnetic layer 830, a second main pole soft-magnetic layer 831, a third main pole soft-magnetic layer 832 and a main pole center layer 833 are stacked sequentially in this order and non-magnetic layers 80 are intercalated in three interlayer portions respectively. The non-magnetic layers may also be intercalated in only one or two of the three interlayer portions. In this embodiment, because a magnetization direction of each magnetically isolated layer becomes stable due to magnetostatic interaction among the layers, domains in each layer can be controlled easily. Furthermore, remanent magnetizations of top end portions of two adjacent layers can be designed to become anti-parallel to each other by controlling the thicknesses of the non-magnetic layers. This anti-parallel structure can cause the remanent magnetizations, which is likely to cause the pole eraser phenomenon that is a problem of perpendicular magnetic recording, to be significantly decreased.

This embodiment with intercalated non-magnetic layers can be considered as a similar case in which the $B_{S821}$ of the layer 821 is set to zero in the embodiment shown in FIG. 8*c*. Therefore, as well as the embodiment shown in FIG. 8*c*, when the saturation magnetic flux density has a tendency to be decreased toward inner layer where the regression line of the distribution has a negative slope, the magnetic field contour line can be designed to become a curve with various curvatures or a straight line by controlling thicknesses and saturation magnetic flux densities of respective layers as parameters.

FIGS. 9*a* to 9*d* show graphs for explaining a regression line slope obtained by least square method in the distribution of a saturation magnetic flux density of each constituent layer in the main magnetic pole layer of the thin-film magnetic head according to the present invention.

Figure 9A:
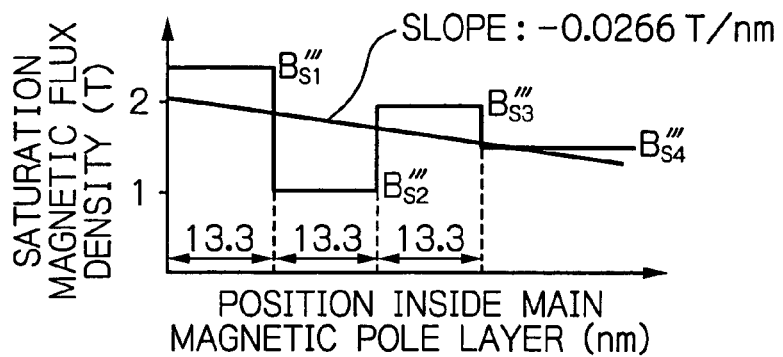
FIGS. 9a to 9d show graphs for explaining a regression line slope obtained by least square method in the distribution of a saturation magnetic flux density of each constituent layer in the main magnetic pole layer of the thin-film magnetic head according to the present invention.

In FIG. 9*a*, shown is a slope of a regression line in the distribution of a saturation magnetic flux density of each constituent layer according to the embodiment shown in FIG. 8*c*. The whole shape and dimension of the main magnetic pole layer 82 is the same as that of the embodiment shown in FIG. 6*b*. And the thicknesses and saturation magnetic flux densities of the first main pole soft-magnetic layer 820, the second main pole soft-magnetic layer 821 and the third main pole soft-magnetic layer 822 are 13.3 nm and 2.40 T, 13.3 nm and 1.00 T (the smallest value), and 13.3 nm and 2.00 T respectively and the saturation magnetic flux density of the main pole center layer 823 is 1.50 T.

In this embodiment, as shown in the figure, the slope of the regression line becomes a negative value of −0.0266 T/nm, that is to say, the saturation magnetic flux density is set to be decreased toward inner layer on average, as described above.

Figure 9B:
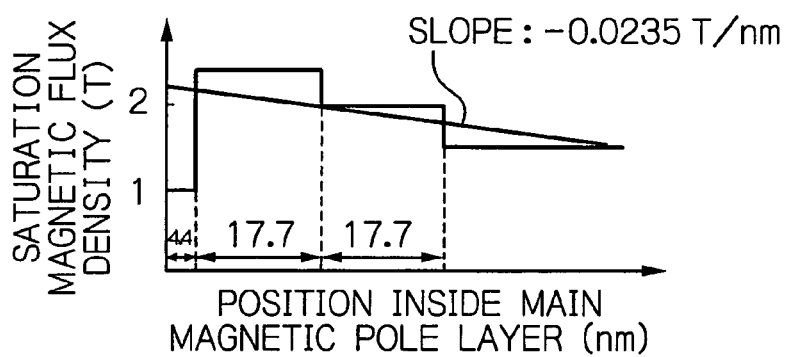

Next, in FIG. 9*b*, an outmost first main pole soft-magnetic layer has a smallest thickness and a lowest saturation magnetic flux density in a four-layered structure. The whole shape and dimension of the main magnetic pole layer is the same as that of the embodiment shown in FIG. 6*b*. And the thicknesses and saturation magnetic flux densities of the first main pole soft-magnetic layer, the second main pole soft-magnetic layer and the third main pole soft-magnetic layer are 4.4 nm and 1.00 T (the smallest value), 17.7 nm and 2.40 T, and 17.7 nm and 2.00 T respectively and the saturation magnetic flux density of the main pole center layer is 1.50 T.

According to the figure, the slope of the regression line becomes a negative value of −0.0235 T/nm, that is to say, the saturation magnetic flux density is set to be decreased toward inner layer on average even though the thin first main pole soft-magnetic layer having the lowest saturation magnetic flux density is provided on the outmost side of the three-layered structure. Therefore, this alternative is also within the scope of the present invention.

Figure 9C:
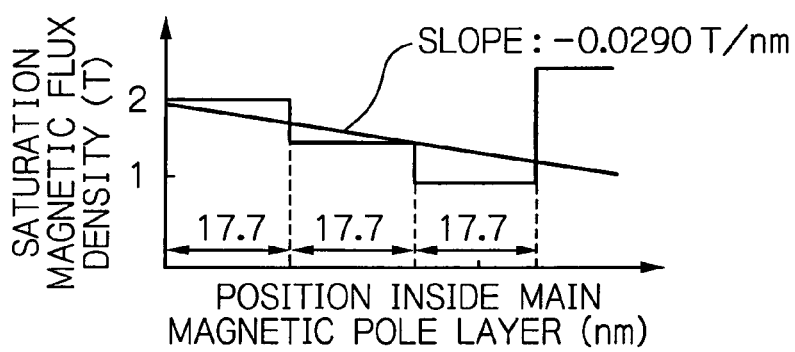
Figure 9D:
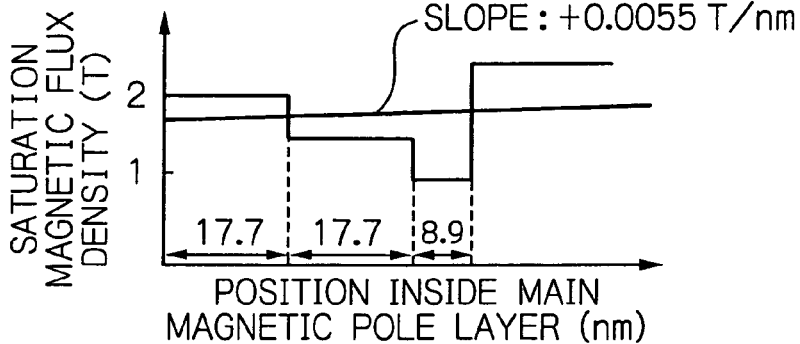

Next, in FIGS. 9c and 9d, an innermost main pole center layer has a highest saturation magnetic flux density in a four-layered structure. The whole shape and dimension of the main magnetic pole layer is the same as that of the embodiment shown in FIG. 6b. And the thicknesses and saturation magnetic flux densities of the first main pole soft-magnetic layer and the second main pole soft-magnetic layer are 17.7 nm and 2.00 T, 17.7 nm and 1.50 T respectively, and the saturation magnetic flux densities of the third main pole soft-magnetic layer and the main pole center layer are 1.00 T and 2.40 T (the largest value). In the alternatives shown in FIGS. 9c and 9d, respective thicknesses of the third main pole soft-magnetic layer are 17.7 nm and 8.9 nm (almost half value of that in FIG. 9c). Therefore, the volume of the main pole center layer with the highest saturation magnetic flux density shown in FIG. 9d becomes larger than that shown in FIG. 9c.

According to FIGS. 9c and 9d, the slopes of the regression lines become a negative value of −0.0290 T/nm and a positive value of +0.0055 T/nm respectively. In other words, in the case shown in FIG. 9c, the saturation magnetic flux density is set to be decreased toward inner layer on average, and the case is within the scope of the present invention. However, in the case shown in FIG. 9d, the saturation magnetic flux density is not decreased toward inner layer on average because the main pole center layer with the highest saturation magnetic flux density has the larger volume. Therefore, the degree of the curvature of the magnetic field contour conventionally curved toward the trailing side can not be decreased. Accordingly, it is a main required condition of the present invention that the regression line obtained by least square method of the distribution of the saturation magnetic flux density has a negative slope.

FIGS. 10a to 10e show cross-sectional drawings viewing from the ABS side explaining a first-half manufacturing process of the main magnetic pole layer and the surrounding structure according to the embodiment shown in FIG. 6.

Figure 10A:
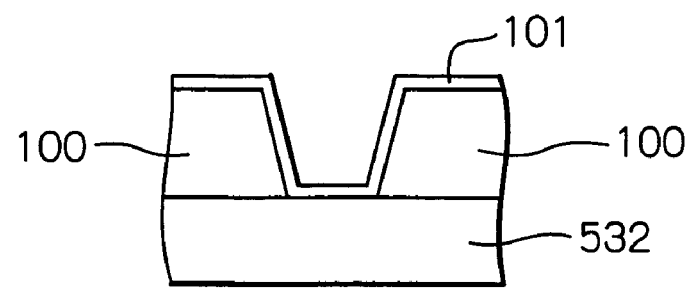
FIGS. 10a to 10e show cross-sectional drawings viewing from the ABS side explaining a first-half manufacturing process of the main magnetic pole layer and the surrounding structure according to the embodiment shown in FIG. 6.

First, as shown in FIG. 10a, a patterned resist layer 100 is formed on the intermediate non-magnetic layer 532 shown in FIG. 6a, and a Ta film to be a base coat layer 101 is formed on the patterned resist layer 100 and the intermediate non-magnetic layer 532 by using, for example, sputtering technique.

Figure 10B:
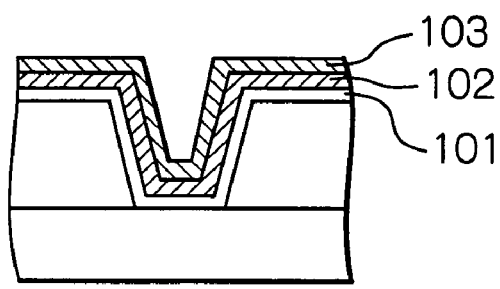

Next, as shown in FIG. 10b, an alloy film 102 to be the first main pole soft-magnetic layer 5400 is deposited on the base coat layer 101, and then, an alloy film 103 to be the second main pole soft-magnetic layer 5401 is deposited on the alloy film 102. Respective alloy films 102 and 103 may be formed of an alloy made from two or three elements of a group consisting of Ni, Fe and Co, or an alloy made from the above two or three elements to which at least one element of a group consisting of B, C, N, Al, Si, Cu, Zr, Hf, Ta, Ti, Mg, Mn, Nb, Mo, V and Cr is added, by using, for example, sputtering technique. The respective alloy films may also be formed of an alloy made from two or three elements of a group consisting of Ni, Fe and Co by using, for example, plating technique.

Figure 10C:
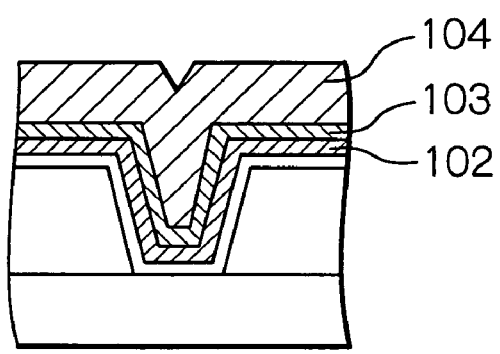

Furthermore, as shown in FIG. 10c, an alloy film 104 to be the main pole center layer 5402 is deposited on the alloy film 103, formed of an alloy made from two or three elements of a group consisting of Ni, Fe and Co by using, for example, plating technique. The alloy film 104 may also be formed of an alloy made from two or three elements of a group consisting of Ni, Fe and Co, or an alloy made from the above two or three elements to which at least one element of a group consisting of B, C, N, Al, Si, Cu, Zr, Hf, Ta, Ti, Mg, Mn, Nb, Mo, V and Cr is added, by using, for example, sputtering technique. The deposition of the alloy film 104 is performed at least until the trapezoid region equivalent to the shape of the main magnetic pole layer is filled with the alloys.

The respective compositions of the alloy films 102, 103 and 104 are adjusted so that the respective saturation magnetic flux densities $B_{S1}$, $B_{S2}$ and $B_{S3}$ of the alloy films 102, 103 and 104 have predetermined values satisfying relations of $B_{S1} > B_{S2} > B_{S3}$.

Meanwhile, when manufacturing the structure in which the main magnetic pole layer has a continuously changed saturation magnetic flux density as shown in FIG. 8b, an alloy film made from two or three elements of a group consisting of Ni, Fe and Co, or an alloy film made from the above two or three elements to which at least one element of a group consisting of B, C, N, Al, Si, Cu, Zr, Hf, Ta, Ti, Mg, Mn, Nb, Mo, V and Cr is deposited on the base coat layer 101 by using, for example, sputtering technique. Instead of the above alloy film, an alloy film made from two or three elements of a group consisting of Ni, Fe and Co may also be deposited by using, for example, plating technique. In these deposition cases, appropriate deposition conditions are continuously varied during deposition to change composition ratios mainly of Fe, Ni and Co, and this gives a predetermined distribution in which saturation magnetic flux density is monotonically decreased as the deposition proceeds. The deposition is performed at least until the trapezoid region equivalent to the shape of the main magnetic pole layer is filled with the alloy film.

Figure 10D:
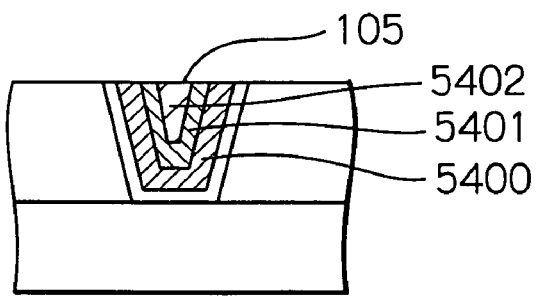
Figure 10E:
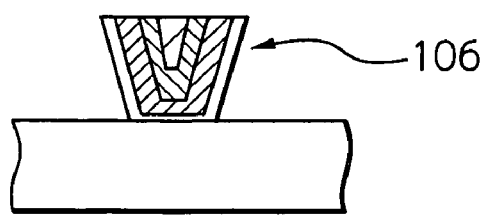

Next, as shown in FIG. 10d, the end surface 105 on which edges of the first and second main pole soft-magnetic layers 5400 and 5401 and the main pole center layer 5402 are exposed with the main pole center layer 5402 as a central part, is formed by using CMP method and/or ion milling technique. After that, as shown in FIG. 10e, the resist layer 100 is removed, and the above-described process gives a multilayered structure 106 to be the main magnetic pole layer 540, barely formed on the intermediate non-magnetic layer 532.

Figure 11A:
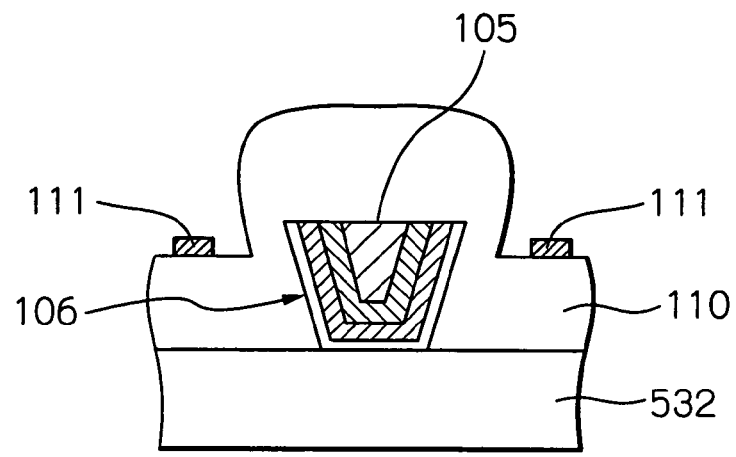
FIGS. 11a to 11c show cross-sectional drawings viewing from the ABS side explaining a last-half manufacturing process of the main magnetic pole layer and the surrounding structure according to the embodiment shown in FIG. 6.
Figure 11B:
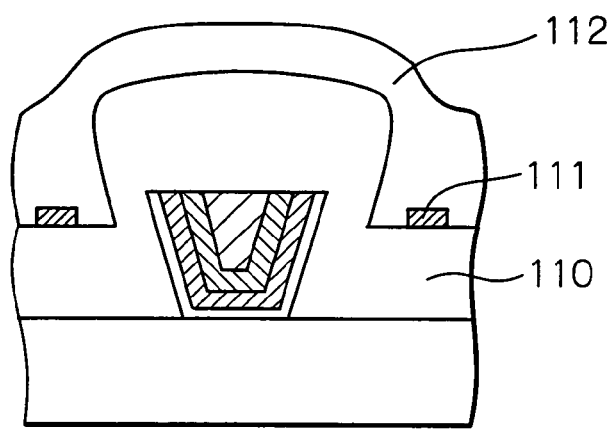
Figure 11C:
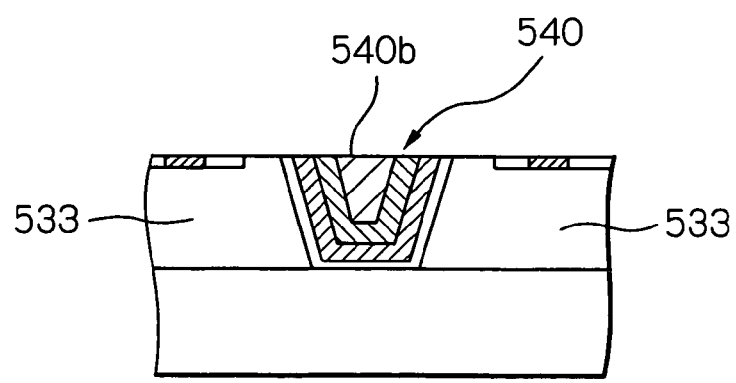

FIGS. 11a to 11c show cross-sectional drawings viewing from the ABS side explaining a last-half manufacturing process of the main magnetic pole layer and the surrounding structure according to the embodiment shown in FIG. 6.

First, as shown in FIG. 11a, a first covering film 110 to be the upper non-magnetic layer 533 is deposited on the multi-layered structure 106 and the intermediate non-magnetic layer 532, formed of, for example, $Al_2O_3$, etc., by using, for example, sputtering technique. Next, a stop film 111 is provided in a position adjacent to the multilayer structure 106 and closer to the upper surface of the intermediate non-magnetic layer 532 than the end surface 105 of the multilayer structure 106, formed of a material with low polishing rate in CMP such as a Ta, by using, for example, sputtering technique and photolithography method.

Next, as shown in FIG. 11b, a second covering film 112 is deposited on the first covering film 110 and the stop film 111, formed of, for example, $Al_2O_3$, etc., by using, for example, sputtering technique. Then, as shown in FIG. 11c, the trailing end surface 540b that is in plane with polished surfaces of the first and second covering layers 110 and 112 and is to be opposed to the auxiliary magnetic pole layer, is formed by performing CMP to the position of the stop film 111. The above-described process gives the finished main magnetic pole layer 540 and the upper non-magnetic layer 533.

Hereinafter, the effect of the above-described manufacturing method according to the present invention will be explained. In order to obtain a desired shape of the write field contour adjacent to the trailing edge of the main magnetic pole layer, it is required that the shape, the size, the multilayered structure and the trailing edge structure of the main magnetic pole layer are provided with high dimensional accuracy. According to the manufacturing method of the present invention, the shape and size of the main magnetic pole layer can be controlled with high accuracy by adjusting the pattern shape of the resist layer and using CMP method with the stop film and/or ion milling technique. The thickness and composition of the multilayered structure can be controlled with high accuracy by using sputtering technique, plating technique and other deposition methods. Further, the trailing edge structure can be controlled with high accuracy by providing the multilayered structure with high dimensional accuracy and then using CMP method with the stop film and/or ion milling technique. Consequently, according to the manufacturing method of the present invention, the thin-film magnetic head exerting the above-described particular effect can be stably produced with high accuracy.

It is obvious that the constituent materials and the forming methods of the first and second main pole soft-magnetic layers, the main pole center layer, the base coat layer, the first and second covering films and the stop film according to the present invention are not limited to the above-described one, and it is also possible to apply other various materials and methods.

Hereinafter, simulation results showing that the write field contour generated from the main magnetic pole layer can be flexibly designed will be explained.

COMPARATIVE EXAMPLE

Figure 12A:
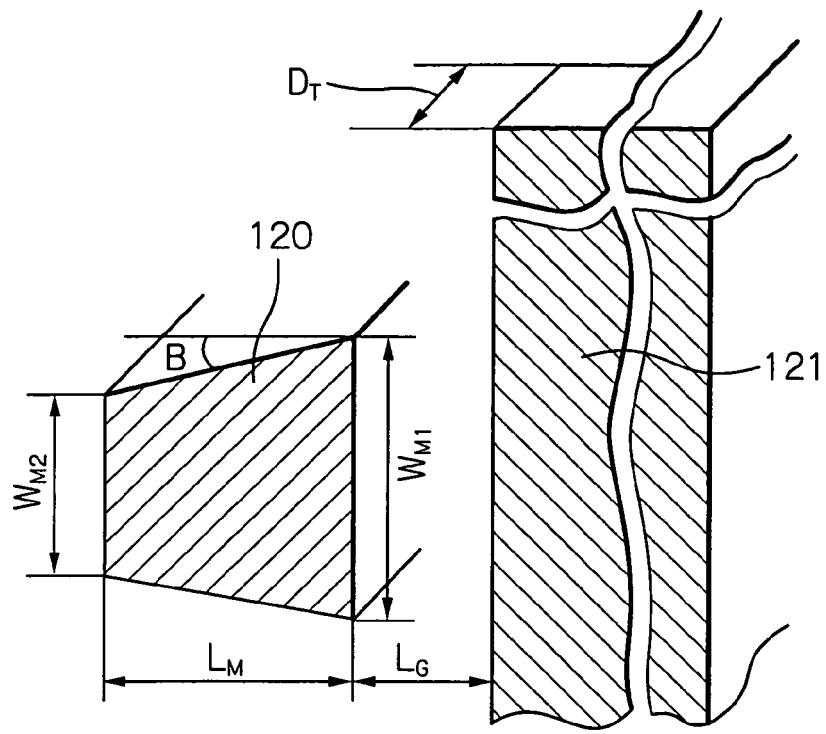
FIG. 12a shows a cross-sectional view illustrating a structure of a main magnetic pole of a conventional thin-film magnetic head for perpendicularly magnetic recording as a comparative example.
Figure 12B:
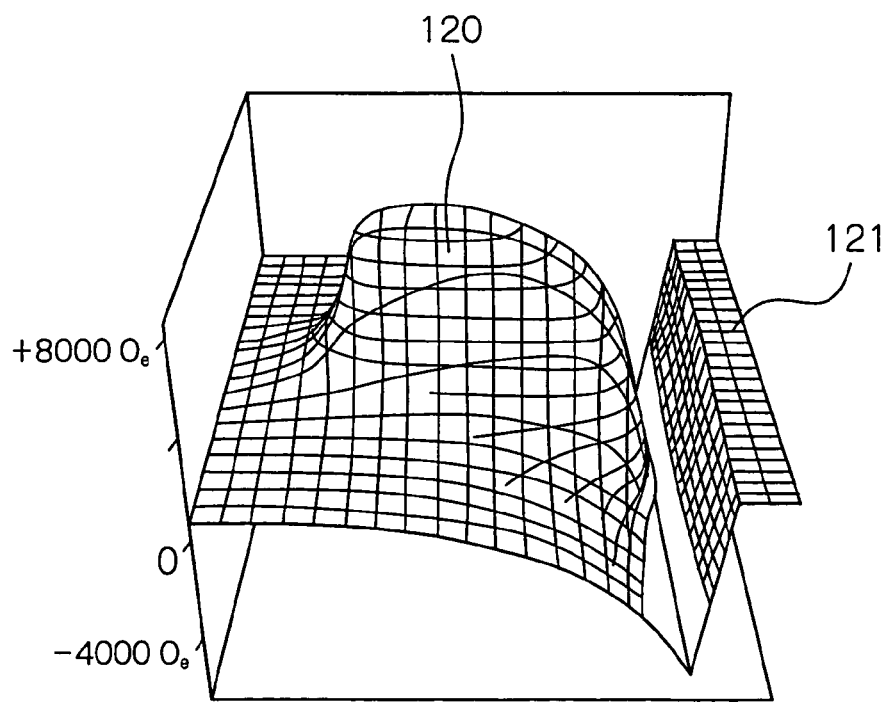
FIG. 12b and FIGS. 13a and 13b show characteristic graphs by simulation illustrating the distribution of the write field generated from the main magnetic pole.
Figure 13A:
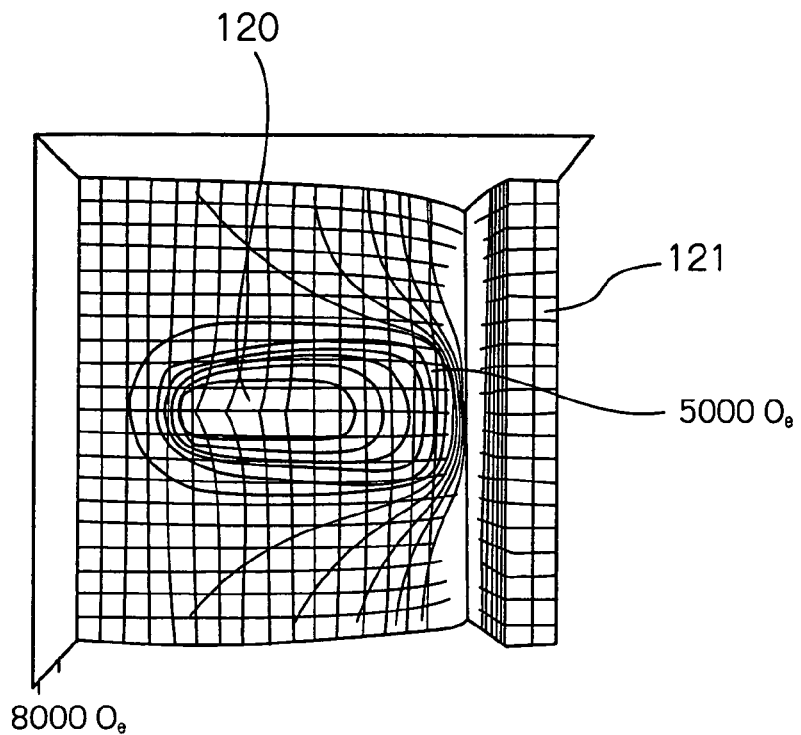
Figure 13B:
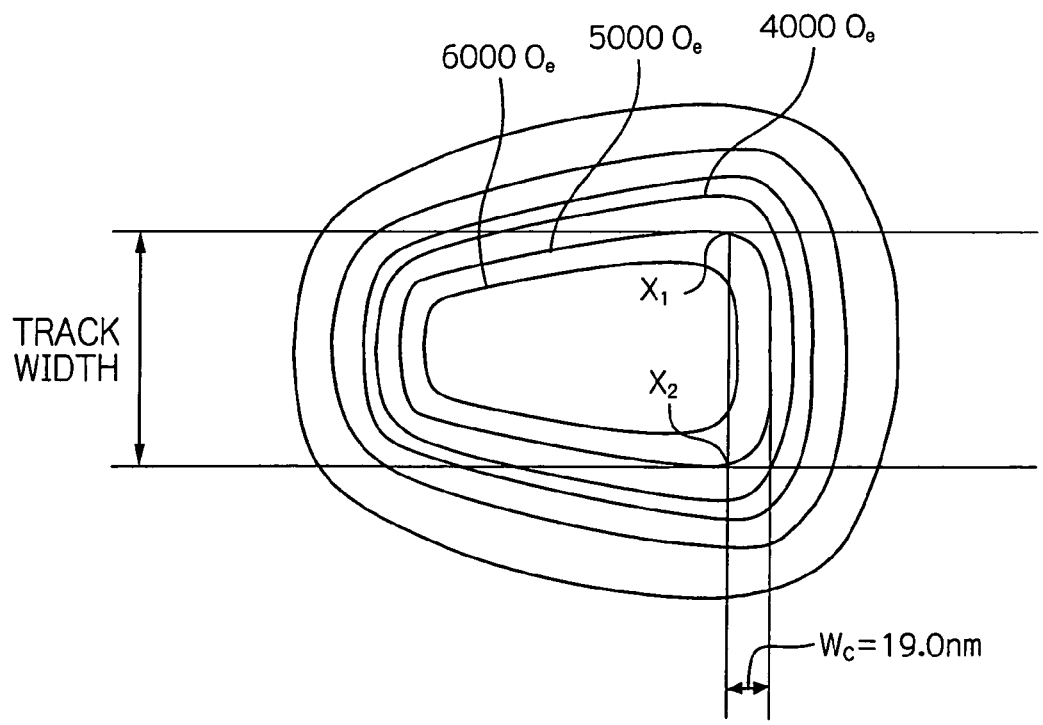

FIG. 12a shows a cross-sectional view illustrating a structure of a main magnetic pole of a conventional thin-film magnetic head for perpendicularly magnetic recording as a comparative example, and FIG. 12b and FIGS. 13a and 13b show characteristic graphs by simulation illustrating the distribution of the write field generated from the main magnetic pole.

According to FIG. 12a, a main magnetic pole 120 is formed of a single soft-magnetic layer a with saturation magnetic flux density $B_S$ of 2.00 T. In the main magnetic pole 120, the length $W_{M1}$ of the trailing edge as a longer edge of trapezoid is 120 nm, the length $W_{M2}$ of the leading edge as a shorter edge of trapezoid is 66.7 nm, and the distance $L_M$ between the trailing and leading edges as a height of trapezoid is 140 nm. The bevel angle B is 15 degree. Further, the trailing shield gap length $L_G$ is 30 nm, and the thickness $D_T$ in the direction perpendicular to the ABS of the trailing shield portion is 125 nm.

As shown in FIG. 12b, the magnetic field gradient in the trailing shield gap between the main magnetic pole 120 and the trailing shield portion 121 becomes significantly steep, which is attributed to the effect of the trailing shield portion provided for reducing the jitter noise.

In FIG. 13a, shown is the distribution of the magnetic field viewed from the ABS side. According to the figure, any magnetic field contour near the main magnetic pole 120 has a curved line shape surrounding the main magnetic pole 120. The contour of the write field of 5000 Oe (398 kA/m) equivalent to the coercive force of the magnetic disk also has a significantly large curvature near the trailing edge of the main magnetic pole 120.

In FIG. 13b, shown are the surrounding magnetic field contour lines near the main magnetic pole 120. As previously described, the curvature width $W_C$ is defined as a distance between the midpoint of the track width on the magnetization transition region and a line connecting two intersection points between the magnetization transition region and both side-edges of the track respectively. Here, the size and shape of the magnetization transition region almost corresponds to the write field contour line. Therefore, in FIG. 13b, the curvature width $W_C$ becomes equivalent to a distance between a line $X_1X_2$ and the midpoint of the track width on the write field contour line. Here, $X_1$ and $X_2$ are defined as two intersection points between the write field contour line and both side-edges of the track respectively. In this definition, the curvature width $W_C$ has a positive sign when the midpoint is in the trailing side in relation to the line $X_1X_2$. On the contrary, the sign is negative in the case that the midpoint is in the leading side in relation to the line $X_1X_2$. According to FIG. 13b, the curvature width $W_C$ of the write field contour line has a positive value of 19.0 nm.

EMBODIMENT 1

Figure 14A:
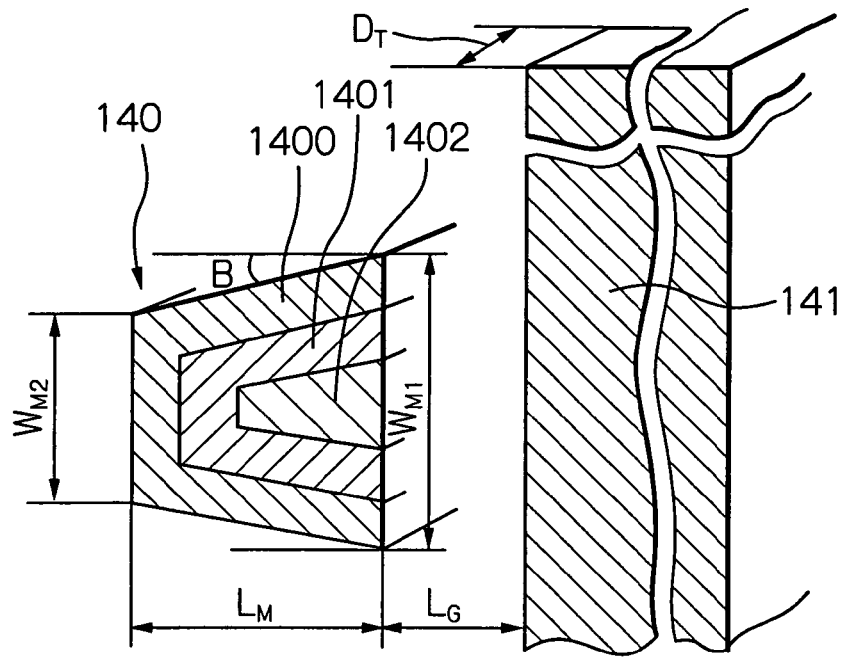
FIG. 14a shows a cross-sectional view illustrating a structure of a main magnetic pole layer of an embodiment 1.
Figure 14B:
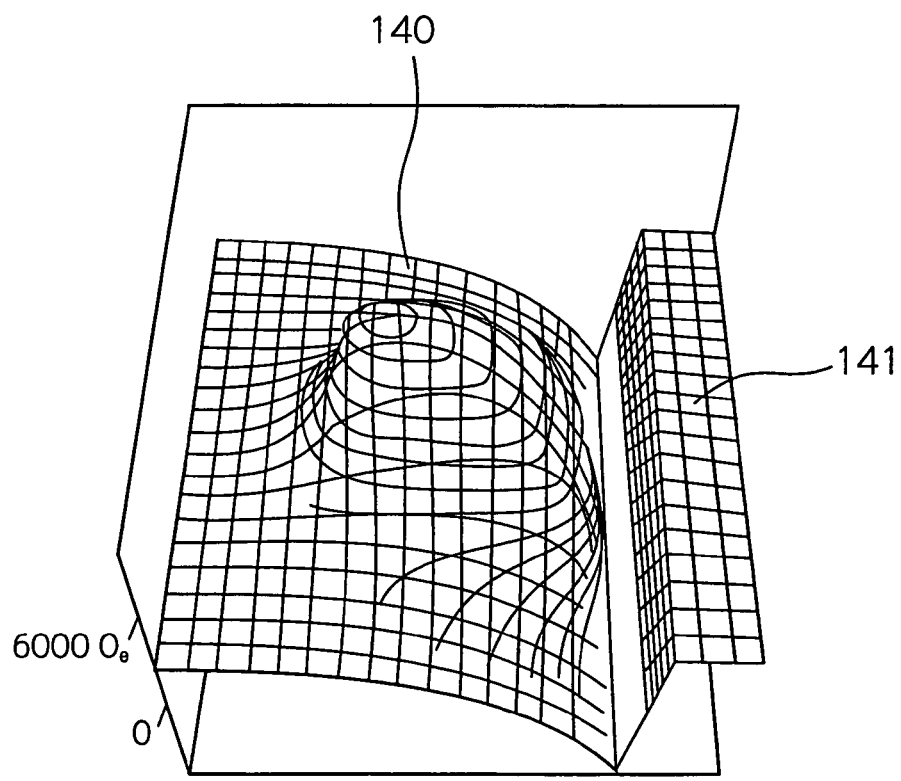
FIG. 14b and FIGS. 15a and 15b show characteristic graphs by simulation illustrating the distribution of the write field generated from the main magnetic pole layer.
Figure 15A:
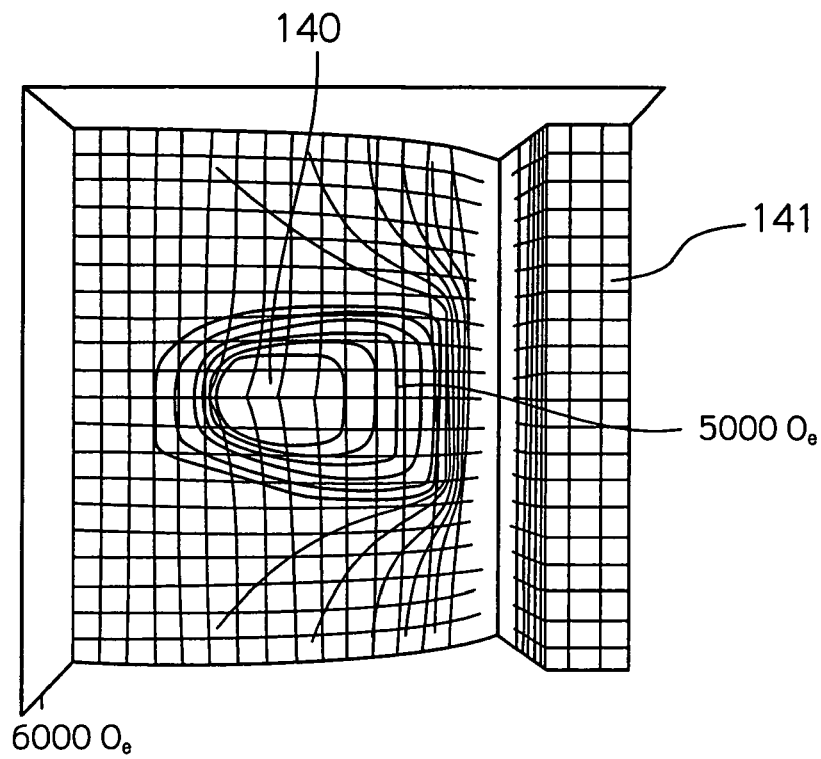
Figure 15B:
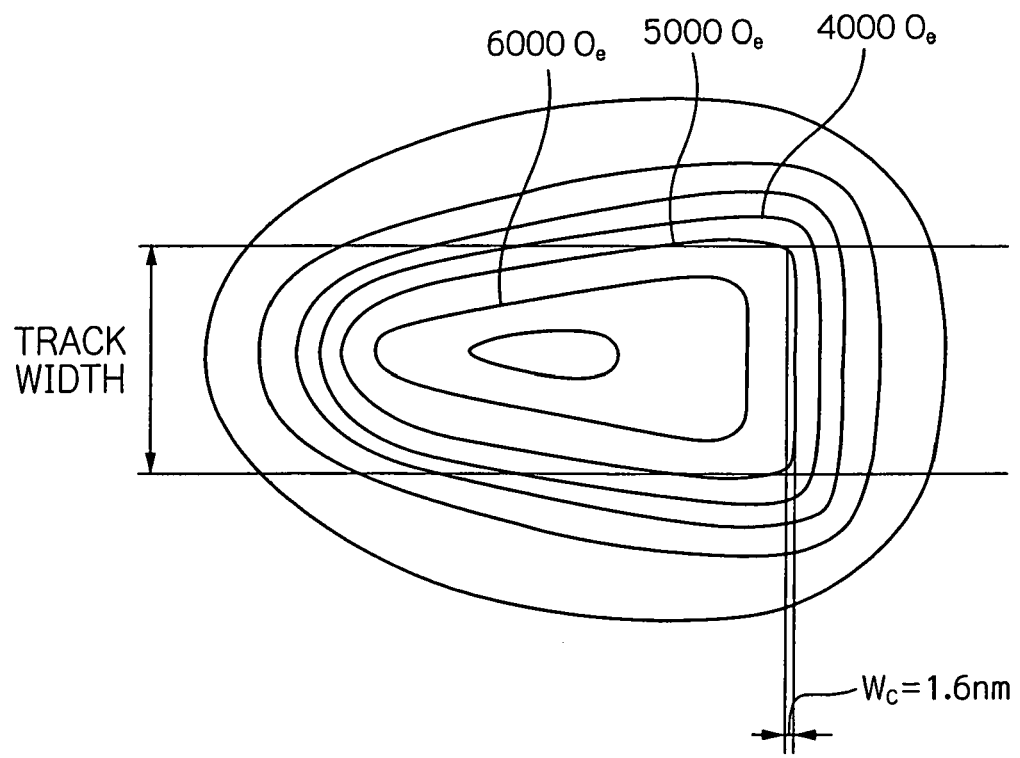

FIG. 14a shows a cross-sectional view illustrating a structure of a main magnetic pole layer of an embodiment 1, and FIG. 14b and FIGS. 15a and 15b show characteristic graphs by simulation illustrating the distribution of the write field generated from the main magnetic pole layer.

According to FIG. 14a, the main magnetic pole layer 140 has a three-layered structure formed of a first main pole soft-magnetic layer 1400 with thickness of 26.6 nm and saturation magnetic flux density of 2.00 T, a second main pole soft-magnetic layer 1401 with thickness of 26.6 nm and saturation magnetic flux density of 1.60 T and a main pole center layer 1402, filling the rest portion of the main magnetic pole layer, with thickness of 13.3 nm and saturation magnetic flux density of 1.45 T. The whole shape and size of the main magnetic pole layer 140 is the same as the main magnetic pole 120 in the above-described comparative example: the $W_{M1}$ is 120 nm; the $W_{M2}$ is 66.7 nm; the Lm is 140 nm; the bevel angle B is 15 degree; the $L_G$ is 30 nm; and the $D_T$ is 125 nm.

As shown in FIG. 14b, the magnetic field gradient in the trailing shield gap between the main magnetic pole layer 140 and the trailing shield portion 141 becomes significantly steep as well as the above-described comparative example, and further, the magnetic field contour plane in the trailing side of the main magnetic pole layer 140 has some straight lines with almost no curvature extended in the track-width direction, which completely differs from the comparative example shown in FIG. 12b.

In FIG. 15a, shown is the distribution of the magnetic field viewed from the ABS side. According to the figure, the contour of the write field of 5000 Oe (398 kA/m) equivalent to the coercive force of the magnetic disk has an almost straight line shape near the trailing edge of the main magnetic pole 140.

In FIG. 15b, shown are the surrounding magnetic field contour lines near the main magnetic pole 140. As shown in FIG. 15b, the curvature width $W_C$ of the write field contour line has a positive value of 1.6 nm that is one or more order of magnitude smaller than the comparative example. That is to say, the write field contour has an almost straight line shape.

EMBODIMENT 2

Figure 16:
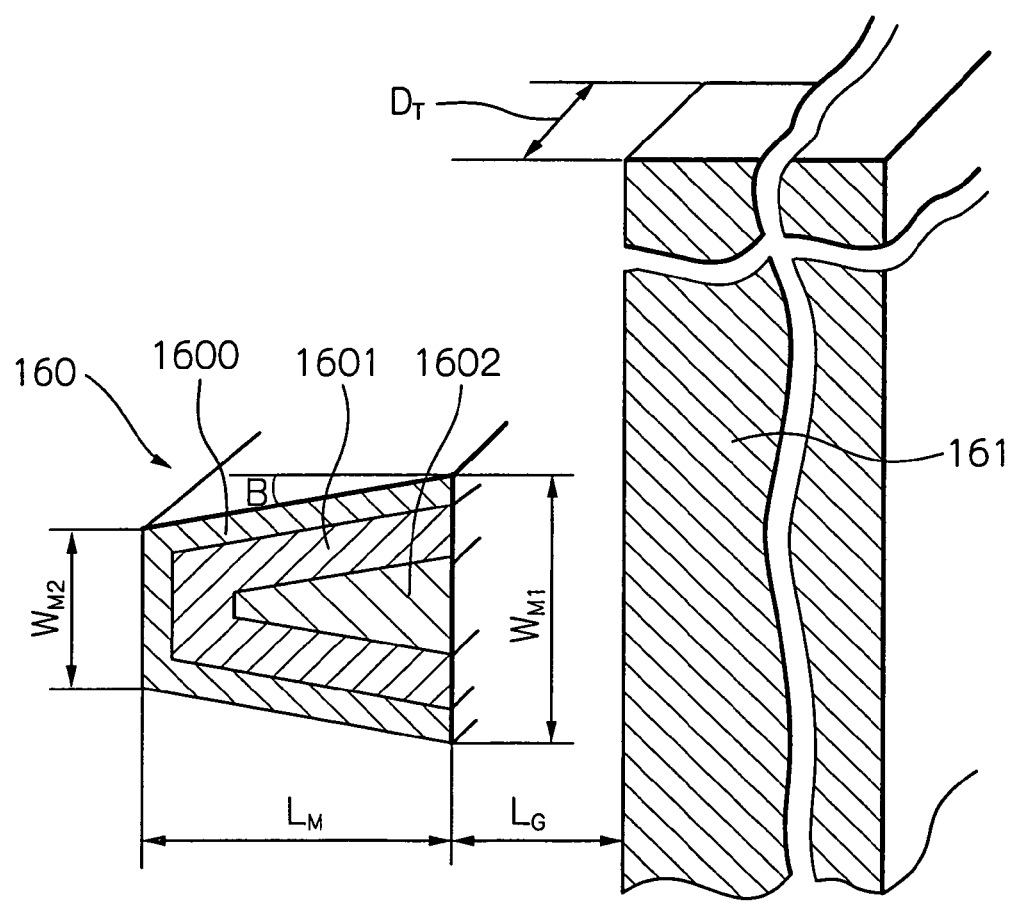
FIG. 16 shows a cross-sectional view illustrating a structure of a main magnetic pole layer of an embodiment 2.
Figure 17A:
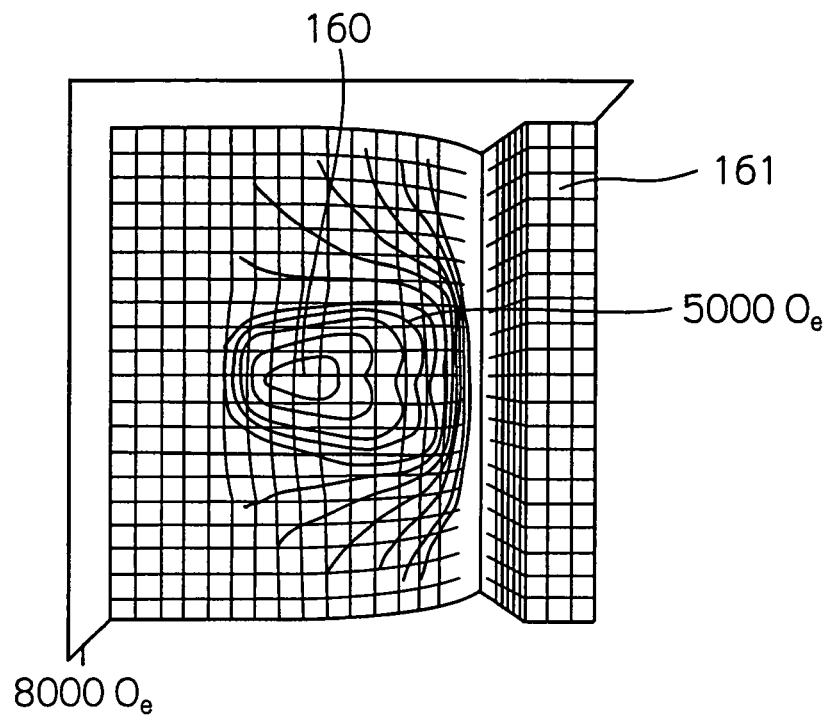
FIGS. 17a and 17b show characteristic graphs by simulation illustrating the distribution of the write field generated from the main magnetic pole layer.
Figure 17B:
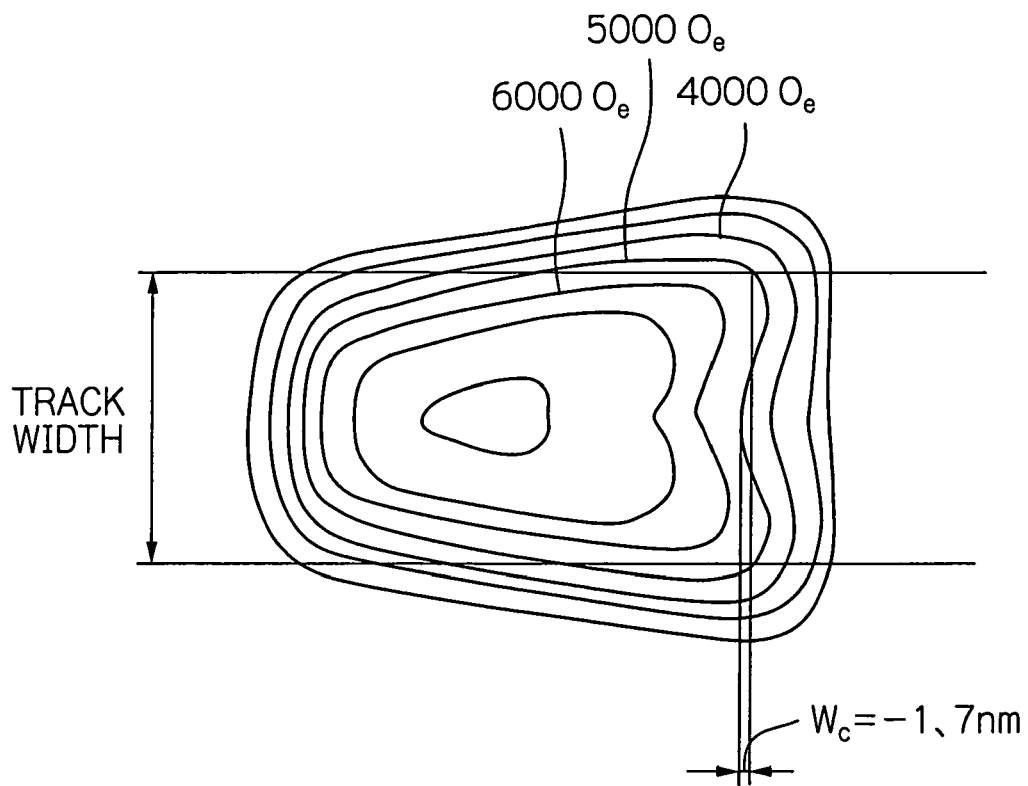

FIG. 16 shows a cross-sectional view illustrating a structure of a main magnetic pole layer of an embodiment 2, and FIGS. 17a and 17b show characteristic graphs by simulation illustrating the distribution of the write field generated from the main magnetic pole layer.

According to FIG. 16, the main magnetic pole layer 160 has a three-layered structure formed of a first main pole soft-magnetic layer 1600 with thickness of 13.3 nm and saturation magnetic flux density of 2.00 T, a second main pole soft-magnetic layer 1601 with thickness of 26.6 nm and saturation magnetic flux density of 1.90 T and a main pole center layer 1602, filling the rest portion of the main magnetic pole layer, with thickness of 26.6 nm and saturation magnetic flux density of 1.32 T. In the main magnetic pole layer 160, the $W_{M1}$ is 120 nm, the $W_{M2}$ is 66.7 nm, the $L_M$ is 140 nm, the bevel angle B is 11 degree, the $L_G$ is 30 nm, and the $D_T$ is 50 nm.

In FIG. 17a, shown is the distribution of the magnetic field viewed from the ABS side. According to the figure, the contour line of the write field of 5000 Oe (398 kA/m) equivalent to the coercive force of the magnetic disk is curved toward the leading side in the center portion.

In FIG. 17b, shown are the surrounding magnetic field contour lines near the main magnetic pole 160. As shown in FIG. 17b, the curvature width $W_C$ of the write field contour line has a negative value of –1.7 nm.

EMBODIMENTS 3 TO 7

Table 1 shows the relations obtained by simulation among the thickness and saturation magnetic flux density of each layer, the slope α of the regression line in the distribution of the saturation magnetic flux density, and the curvature width $W_C$ in embodiments 3 to 7. The respective main magnetic pole layers of the embodiments 3 to 7 have a three-layered structure with the same whole shape and size as those in the embodiment 1, however, have first and second main pole soft-magnetic layers and a main pole center layer with different thickness and saturation magnetic flux density from those the embodiment 1. For comparison, the data of the embodiments 1 and 2 are also shown in the table.

TABLE 1

| Embodiment No. | BS (T) (layer thickness (nm)): 1st pole layer; 2nd pole layer; and pole center layer | Slope (T/nm) | $W_c$ (nm) |
|---|---|---|---|
| 3 | 2.00 T(13.3 nm); 1.90 T(26.6 nm); and 1.81 T(26.6 nm) | –0.0036 | 9.0 |
| 4 | 2.00 T(13.3 nm); 1.93 T(26.6 nm); and 1.73 T(26.6 nm) | –0.0056 | 7.0 |
| 5 | 2.00 T(26.6 nm); 1.82 T(26.6 nm); and 1.73 T(13.3 nm) | –0.0054 | 6.2 |
| 6 | 2.00 T(13.3 nm); 1.90 T(26.6 nm); and 1.60 T(26.6 nm) | –0.0083 | 3.6 |
| 7 | 2.20 T(13.3 nm); 1.80 T(26.6 nm); and 1.60 T(26.6 nm) | –0.0105 | 1.8 |
| 1 | 2.00 T(26.6 nm); 1.60 T(26.6 nm); and 1.45 T(13.3 nm) | –0.0113 | 1.6 |
| 2 | 2.00 T(13.3 nm); 1.90 T(26.6 nm); and 1.32 T(26.6 nm) | –0.0144 | –1.7 |

According to the table, in the embodiments 1 to 7, the curvature width $W_C$ ranges between –1.7 nm and 9.0 nm over zero value. Further, it is substantially possible to realize a curvature width $W_C$ ranging in a larger extent by providing other various structures of the main magnetic pole layer according to the present invention.

As described above, according to the present invention, the curvature width $W_C$ can be set to a negative value as well as a positive value and can be controlled with high accuracy of nanometer or sub-nanometer order, by providing adequate multilayered structures of the main magnetic pole layer without using the hard-controlled method such as a fine processing of the end surface of the main magnetic pole layer. In other words, the present invention sufficiently enables the write field contour to be designed to the desired shape flexibly, which has been impossible by using the conventional technology.

Figure 18A:
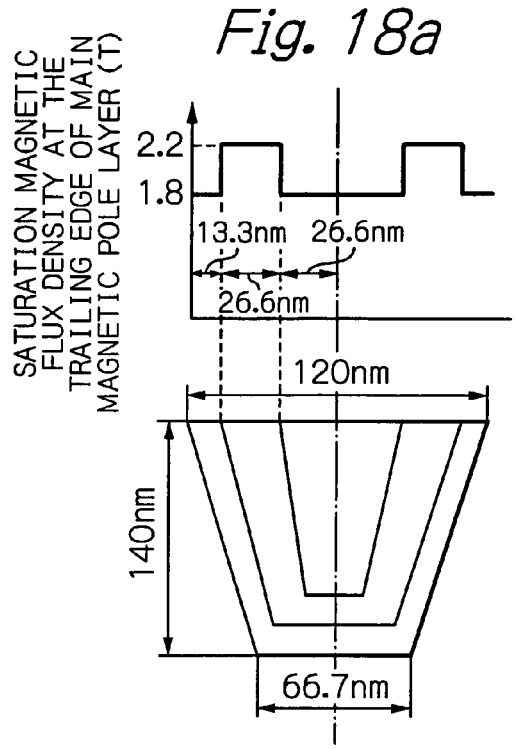
FIGS. 18a to 18c show schematic views illustrating various alternatives of the main magnetic pole layer with the negative slope of the regression line.
Figure 18B:
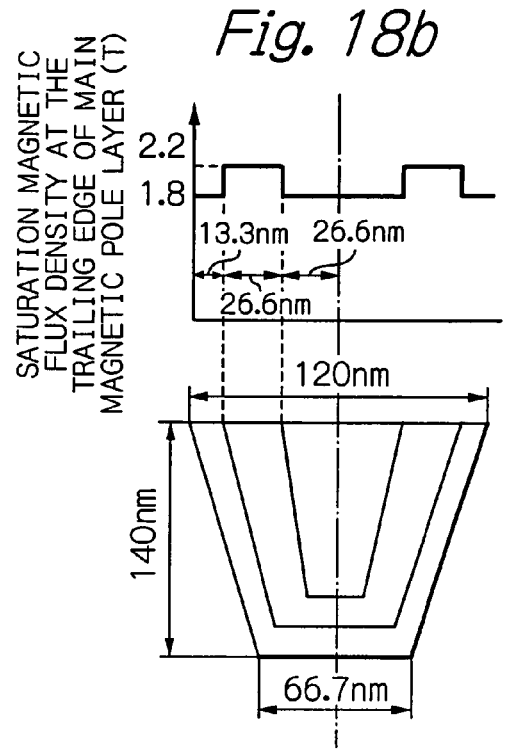
Figure 18C:
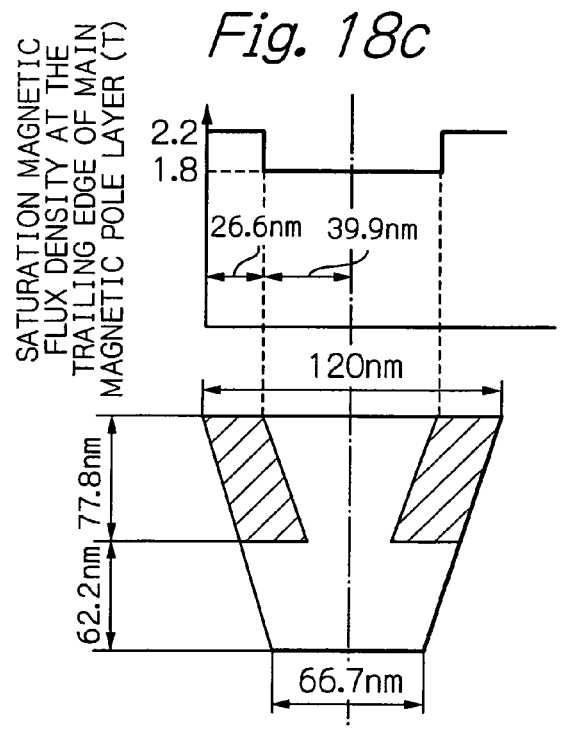

The multilayered structure showing a negative slope of the regression line is not limited to the above-described one, and has other various alternatives. FIGS. 18a to 18c show schematic views illustrating various alternatives of the main magnetic pole layer with the negative slope of the regression line.

According to FIGS. 18a and 18b, in the three-layered structure of the main magnetic pole layer, an outmost first main pole soft-magnetic layer has a lowest saturation magnetic flux density as well as a main pole center layer. However, the regression line slopes of the distributions of the saturation magnetic flux densities in FIGS. 18a and 18b can be set to have negative values of –0.003 T/nm and –0.0015 T/nm respectively.

The main magnetic pole layer shown in FIG. 18c has not a simple multilayered structure, but a structure in which the leading end portion of the first pole soft-magnetic layer is replaced with the portion of the main pole center layer. The regression line slope of this structure can also be set to have negative values of –0.0105 T/nm.

Figure 19:
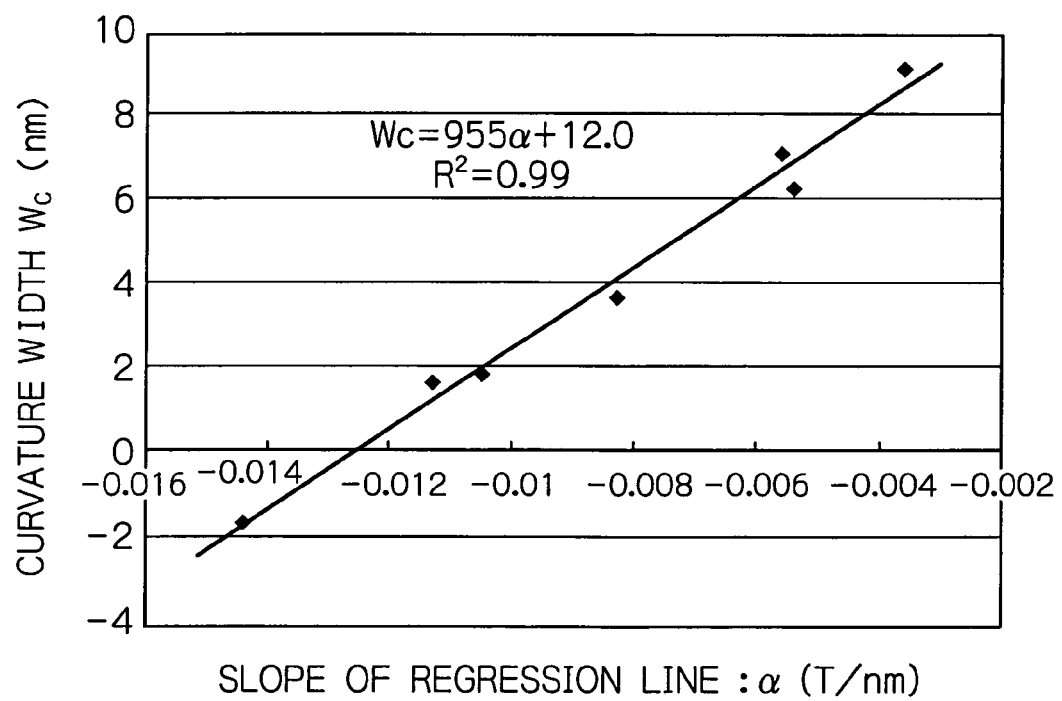
FIG. 19 shows a graph illustrating the relation between the regression line slope of the distribution of the saturation magnetic flux density and the curvature width in the main magnetic pole layer according to the present invention.

FIG. 19 shows a graph illustrating the relation between the regression line slope of the distribution of the saturation magnetic flux density and the curvature width in the main magnetic pole layer according to the present invention. Respective data points in the graph correspond to the above-described embodiments 1 to 7.

According to the figure, the regression line slope α (T/nm) and the curvature width $W_C$ (nm) have a relation:

$$W_C = 955 * \alpha + 12.0 \qquad (1)$$

This relation has the square value of the correlation coefficient R of 0.99, that is, extremely high correlationship. Therefore, it is understood that the curvature width $W_C$ decreases correspondingly from positive value to negative value as the absolute value of the slope α becomes larger.

The Range of the Slope α

Hereinafter, the advantage of providing the main magnetic pole layer with a negative curvature width $W_C$, and further the lower limit of the slope α determined by the relation between a curvature width $W_C$ and a bite error rate, will be explained.

Figure 20:
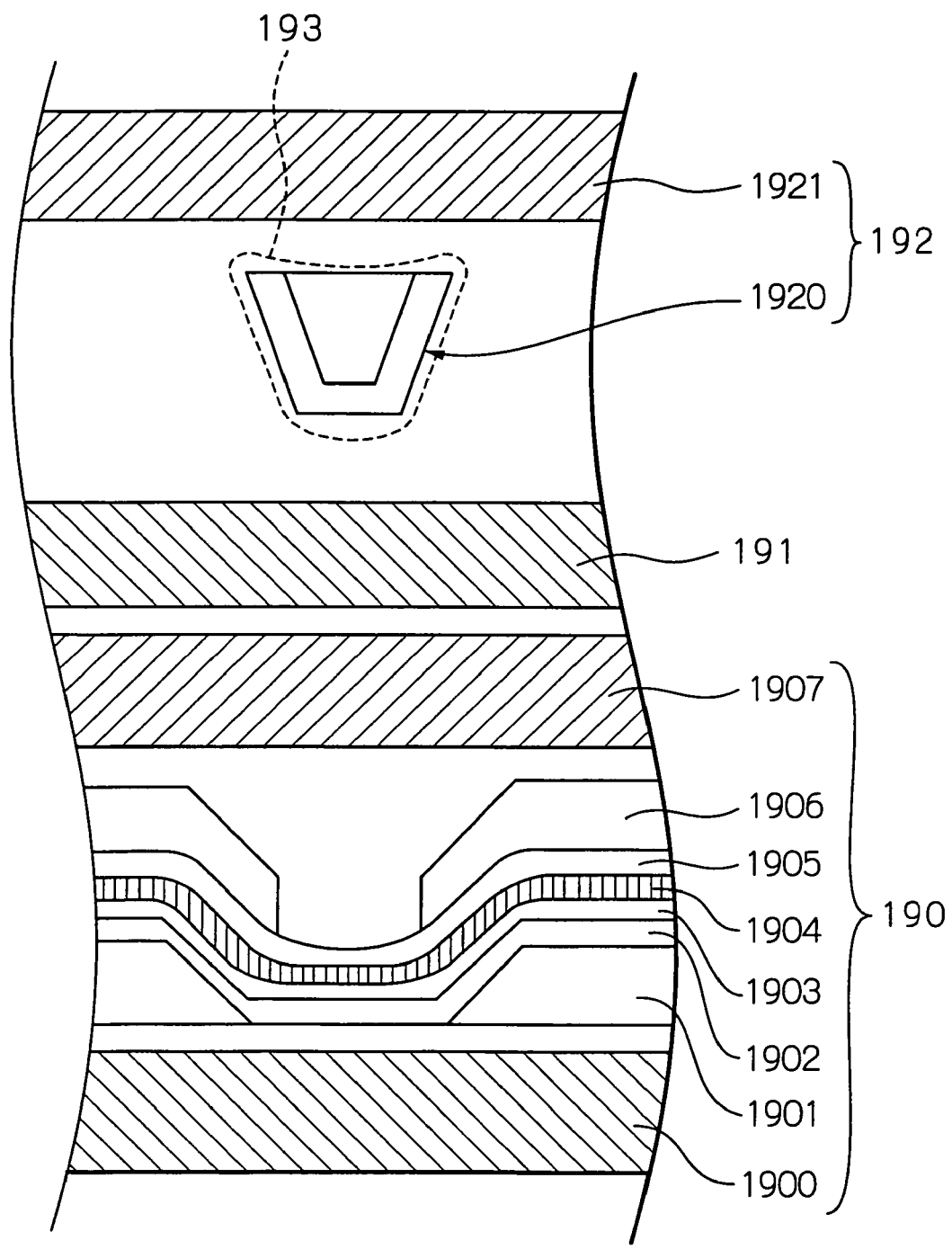
FIG. 20 shows a plain drawing viewed from the ABS side illustrating a structure of the thin-film magnetic head having the main magnetic pole layer with a negative curvature width $W_C$ according to the present invention.

FIG. 20 shows a plain drawing viewed from the ABS side illustrating a structure of the thin-film magnetic head having the main magnetic pole layer with a negative curvature width $W_C$ according to the present invention.

In the figure, an MR read head element 190 has a structure for utilizing CIP-GMR effect. In the structure, a magnetization-pinned layer 1902, a separation layer 1903 and a magnetization-free layer 1904 that senses signal fields are usually stacked sequentially on a hard-bias layer 1901. Therefore, especially, the magnetization-free layer 1904 is usually curved toward the lower shield layer 1900 in the center portion. According to the curvature of the magnetization-free layer 1904, a magnetic sensitivity contour that corresponds to the sensing level of the magnetization-free layer 1904 is also curved toward the same direction as that of the magnetization-free layer 1904.

The main magnetic pole layer 1920 has a write field contour 193 with the negative curvature width $W_C$. The direction of the curvature is the same as that of the magnetic sensitivity contour line of the MR read head element 190. In the present case, the curvature of the write field contour can become equal to that of the magnetic sensitivity contour by providing the adequate multilayered structure of the main magnetic pole layer 1920.

Figure 21A:
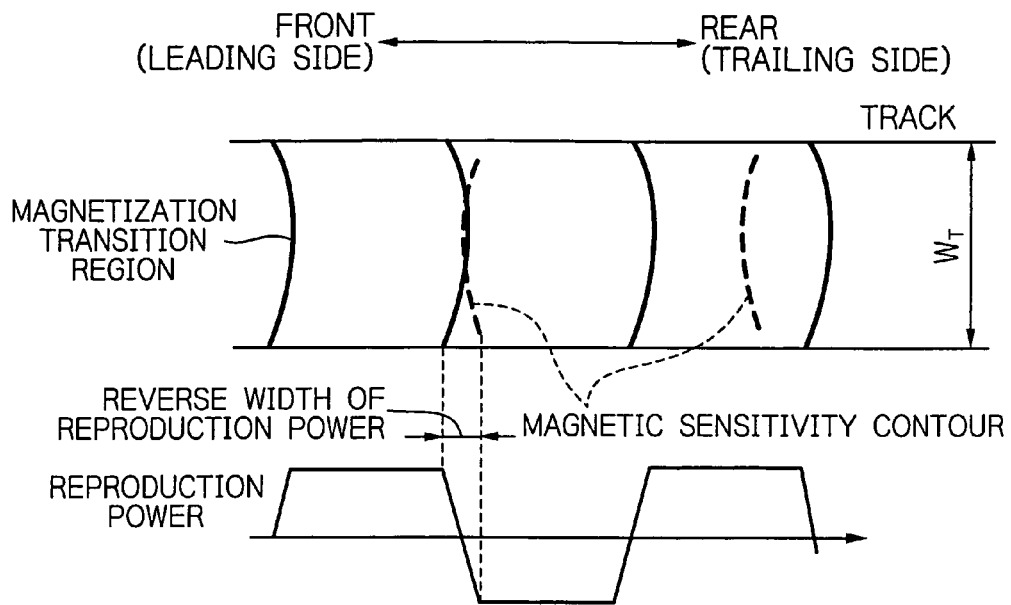
FIG. 21a shows schematic drawings explaining a magnetization transition region between bits recorded by the conventional thin-film magnetic head for perpendicular magnetic recording, and a reproduction power during reading.
Figure 21B:
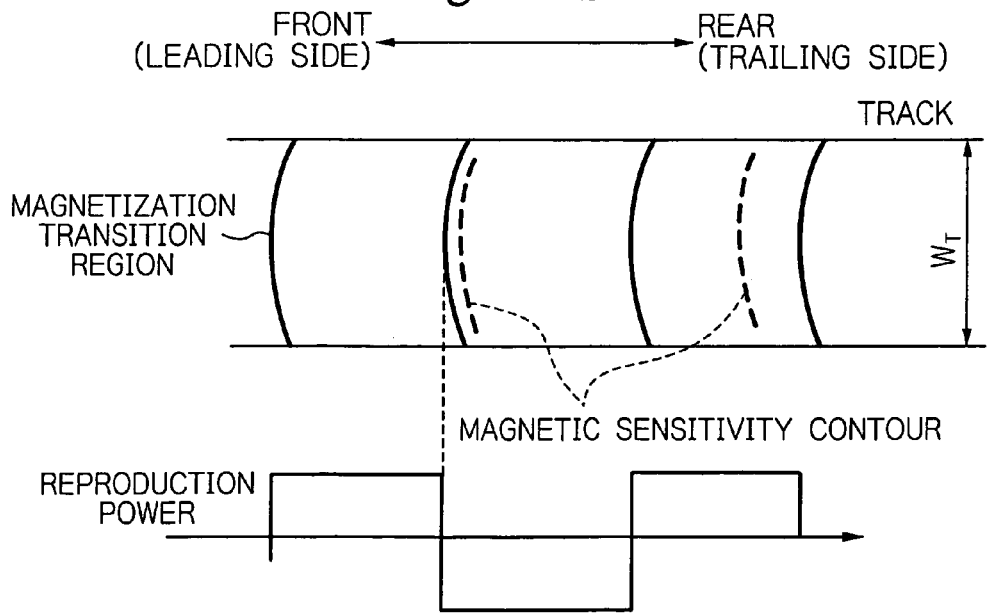
FIG. 21b shows schematic drawings explaining a magnetization transition region between bits recorded by the thin-film magnetic head according to the present invention, and a reproduction power during reading.

FIG. 21*a* shows schematic drawings explaining a magnetization transition region between bits recorded by the conventional thin-film magnetic head for perpendicular magnetic recording, and a reproduction power during reading. FIG. 21*b* shows schematic drawings explaining a magnetization transition region between bits recorded by the thin-film magnetic head according to the present invention, and a reproduction power during reading. In the present invention case shown in FIG. 21*b*, the write field contour has a negative curvature almost equal to that of the magnetic sensitivity contour of the MR read head element.

According to FIG. 21*a*, while the conventional magnetization transition region is curved toward the trailing side in the center portion, the magnetic sensitivity contour of the MR read head element is curved toward the opposite side, that is, leading side in the center portion. As a result, a jitter becomes larger due to the increase in the reverse width of the reproduction power, and the larger jitter causes an error rate to be increased. The jitter also becomes larger due to great variation of the reverse width of the reproduction power generated from the fluctuation of the position in the track-width direction of the MR read head element.

Meanwhile, according to FIG. 21*b*, the curvature width $W_C$ is negative, and the write field contour has the negative curvature almost equal to that of the magnetic sensitivity contour of the MR read head element. In other words, the magnetic sensitivity contour has the almost same curvature in direction and amount as the write field contour. As a result, a jitter becomes much smaller due to the significant decrease in the reverse width of the reproduction power, and the much smaller jitter causes an error rate to be widely decreased. Further, even when the position in the track-width direction of the MR read head element fluctuates, the variation of the reverse width of the reproduction power is suppressed due to the same curvatures, and the error rate can be prevented from being significantly increased.

Therefore, only reducing the degree of the curvature of the magnetic field contour is not sufficient, and it is needed to design the magnetic field contour with wide design range including the direction of the curvature in order to suppress the increase in not only the error rate but also the effective width of the magnetization transition region for corresponding to higher-density recording. According to the present invention, it is quite possible to design the curvature flexibly.

However, when the curvature width $W_C$ has a larger negative value and the write field contour has the larger negative curvature than that of the magnetic sensitivity contour of the MR read head element, a jitter becomes larger due to the increase in the reverse width of the reproduction power, and the larger jitter causes an error rate to be increased. Therefore, there is a lower limit of the adequate curvature width $W_C$.

Here, the smaller the track width $W_T$ to be recorded becomes, the more significant the influence of the jitter, that is, the curvature width $W_C$ becomes. Therefore, the ratio of $W_C/W_T$ can be appropriately adopted as a parameter for considering the error rate.

Figure 22:
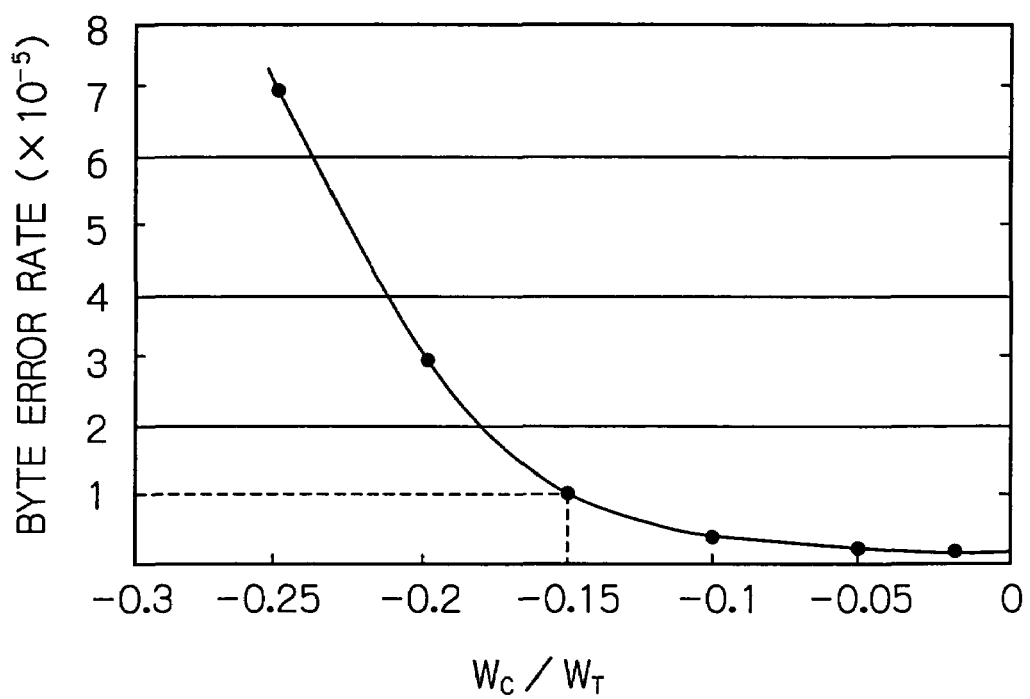
FIG. 22 shows a graph illustrating the relation between the negative curvature width $W_C$ and a simulated bite error rate.

FIG. 22 shows a graph illustrating the relation between the negative curvature width $W_C$ and a simulated bite error rate. In the figure, the lateral axis is the ratio of $W_C/W_T$, and absolute value of the ratio becomes larger toward the left side of the figure.

According to the figure, the bite error rate is only gradually increased as the absolute value of $W_C/W_T$ increases until the value of $W_C/W_T$ is $-0.15$, and does not exceed an upper limit in production of $1.0*10^{-5}$. The bite error rate exceeds the upper limit when the absolute value of $W_C/W_T$ becomes larger than 0.15. Therefore, the lower limit condition of the ratio of $W_C/W_T$ is represented by the following expression:

$$-0.15 \leq W_C/W_T \qquad (2)$$

where the amount of $W_T$ corresponds to the length of the trailing edge (the trailing width) of the main magnetic pole layer. For example, when the amount of $W_T$ is 100 nm, the lower limit of the $W_C$ is $-15$ nm. By substituting the expression (2) into the above expression (1), the following expression is obtained:

$$-(0.000157*W_T + 0.0126) \leq \alpha \qquad (3)$$

where the unit of the $W_C$ and $W_T$ is nanometer. From this relation, it is noticed that the lower limit of the regression line slope $\alpha$ is $-(0.000157*W_T+0.0126)$. Therefore, the required condition of the slope $\alpha$ is represented by the following expression:

$$-(0.000157*W_T+0.0126) \leq \alpha < 0 \qquad (4)$$

Further, from the right hand relation of the expression (4) and the expressions (1) and (2), the required condition of the amount of $W_C$ is obtained:

$$-0.15*W_T \leq W_C < 12 \qquad (5)$$

where the unit of the $W_C$ and $W_T$ is nanometer.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising at least one inductive write head element comprising:
   a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;
   an auxiliary magnetic pole layer having one end portion being adjacent to one end portion of said main magnetic pole layer and the other end portion connected magnetically with the other end portion of said main magnetic pole layer; and
   at least one coil layer formed in such a way as to pass through between said main magnetic pole layer and said auxiliary magnetic pole layer for inducing a magnetic flux in said main magnetic pole layer and said auxiliary magnetic pole layer, a curvature width $W_C$ of a contour line of said write field adjacent to a trailing edge on an air bearing surface side of said main magnetic pole layer satisfying the following expression:

$$-0.15*W_T \leq W_C < 12$$

where $W_T$ is a track width and a unit of $W_C$ and $W_T$ is nanometer.

2. The thin-film magnetic head as claimed in claim 1, wherein said contour line of said write field has a straight line shape or an almost straight line shape extending in said track-width direction.

3. The thin-film magnetic head as claimed in claim 1, wherein said thin-film magnetic head further comprises a magnetoresistive read head element for reading signals, and said contour line of said write field has a concave shape that is curved toward a leading side in a center portion in said track-width direction and has a negative curvature width corresponding to a curvature that equals or nearly equals a curvature of a magnetic sensitivity contour of said magnetoresistive read head element during reading signals.

4. The thin-film magnetic head as claimed in claim 1, wherein said main magnetic pole layer comprises a main pole center layer and at least one main pole soft-magnetic layer that is formed in such a way as to cover both side end surfaces in said track-width direction and a leading end surface of said main pole center layer.

5. The thin-film magnetic head as claimed in claim 4, wherein said at least one main pole soft-magnetic layer is a plurality of main pole soft-magnetic layers.

6. The thin-film magnetic head as claimed in claim 4, wherein a saturation magnetic flux density of an outmost layer of said at least one main pole soft-magnetic layer is higher than a saturation magnetic flux density of said main pole center layer.

7. The thin-film magnetic head as claimed in claim 4, wherein a saturation magnetic flux density of any layer of said at least one main pole soft-magnetic layer is equal to or higher than a saturation magnetic flux density of a layer neighboring an inner surface of said any layer.

8. The thin-film magnetic head as claimed in claim 4, wherein said at least one main pole soft-magnetic layer and said main pole center layer are stacked from outside in a descending order of the amount of saturation magnetic flux density.

9. The thin-film magnetic head as claimed in claim 4, wherein a saturation magnetic flux density of an outmost layer of said at least one main pole soft-magnetic layer is lower than a saturation magnetic flux density of a layer neighboring an inner surface of said outmost layer.

10. The thin-film magnetic head as claimed in claim 4, wherein at least one non-magnetic layer is intercalated in at least one interlayer portion respectively in a multilayered structure of said at least one main pole soft-magnetic layer and said main pole center layer.

11. The thin-film magnetic head as claimed in claim 1, wherein an inner saturation magnetic flux density of said main magnetic pole layer is varied continuously from said both side end surfaces and said leading end surface, toward said center portion of said trailing end surface.

12. The thin-film magnetic head as claimed in claim 11, wherein said inner saturation magnetic flux density is monotonically decreased continuously from said both side end surfaces and said leading end surface, toward said center portion of said trailing end surface.

13. The thin-film magnetic head as claimed in claim 1, wherein an end portion on said air bearing surface side of said main magnetic pole layer has a trapezoidal cross-section parallel to said air bearing surface, and a length of a trailing edge of said trapezoidal cross-section becomes longer than a length of a leading edge of said trapezoidal cross-section.

14. The thin-film magnetic head as claimed in claim 1, wherein said auxiliary magnetic pole layer has a trailing shield portion that is formed in an end portion on said air bearing surface side of said auxiliary magnetic pole layer, opposed to an end portion on said air bearing surface side of said main magnetic pole layer, and has a longer length in stacking direction than a length in stacking direction of the other portion of said auxiliary magnetic pole layer.

15. A thin-film magnetic head comprising at least one inductive write head element comprising:

a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;

an auxiliary magnetic pole layer having one end portion being adjacent to one end portion of said main magnetic pole layer and the other end portion connected magnetically with the other end portion of said main magnetic pole layer; and at least one coil layer formed in such a way as to pass through between said main magnetic pole layer and said auxiliary magnetic pole layer for inducing a magnetic flux in said main magnetic pole layer and said auxiliary magnetic pole layer, a slope $\alpha$ of a regression line obtained by least square method of a distribution of said inner saturation magnetic flux density under a condition that a positive direction of position coordinate is defined as a direction from said both side end surfaces and said leading end surface toward said center portion of said trailing end surface, satisfying the following expression:

$$-(0.000157*W_T+0.0126) \leq \alpha < 0$$

where a unit of $\alpha$ is Tesla/nm, $W_T$ is a track width, and a unit of $W_C$ and $W_T$ is nanometer.

16. The thin-film magnetic head as claimed in claim 15, wherein said main magnetic pole layer comprises a main pole center layer and at least one main pole soft-magnetic layer that is formed in such a way as to cover both side end surfaces in said track-width direction and a leading end surface of said main pole center layer.

17. The thin-film magnetic head as claimed in claim 16, wherein said at least one main pole soft-magnetic layer is a plurality of main pole soft-magnetic layers.

18. The thin-film magnetic head as claimed in claim 16, wherein a saturation magnetic flux density of an outmost layer of said at least one main pole soft-magnetic layer is higher than a saturation magnetic flux density of said main pole center layer.

19. The thin-film magnetic head as claimed in claim 16, wherein a saturation magnetic flux density of any layer of said at least one main pole soft-magnetic layer is equal to or higher than a saturation magnetic flux density of a layer neighboring an inner surface of said any layer.

20. The thin-film magnetic head as claimed in claim 16, wherein said at least one main pole soft-magnetic layer and said main pole center layer are stacked from outside in a descending order of the amount of saturation magnetic flux density.

21. The thin-film magnetic head as claimed in claim 16, wherein a saturation magnetic flux density of an outmost layer of said at least one main pole soft-magnetic layer is lower than a saturation magnetic flux density of a layer neighboring an inner surface of said outmost layer.

22. The thin-film magnetic head as claimed in claim 16, wherein at least one non-magnetic layer is intercalated in at least one interlayer portion respectively in a multilayered structure of said at least one main pole soft-magnetic layer and said main pole center layer.

23. The thin-film magnetic head as claimed in claim 15, wherein an inner saturation magnetic flux density of said main magnetic pole layer is varied continuously from said both side end surfaces and said leading end surface, toward said center portion of said trailing end surface.

24. The thin-film magnetic head as claimed in claim 23, wherein said inner saturation magnetic flux density is monotonically decreased continuously from said both side end surfaces and said leading end surface, toward said center portion of said trailing end surface.

25. The thin-film magnetic head as claimed in claim 15, wherein an end portion on said air bearing surface side of said main magnetic pole layer has a trapezoidal cross-section parallel to said air bearing surface, and a length of a trailing edge of said trapezoidal cross-section becomes longer than a length of a leading edge of said trapezoidal cross-section.

26. The thin-film magnetic head as claimed in claim 15, wherein said auxiliary magnetic pole layer has a trailing shield portion that is formed in an end portion on said air bearing surface side of said auxiliary magnetic pole layer, opposed to an end portion on said air bearing surface side of said main magnetic pole layer, and has a longer length in stacking direction than a length in stacking direction of the other portion of said auxiliary magnetic pole layer.

27. A head gimbal assembly comprising:
a thin-film magnetic head comprising at least one inductive write head element comprising:
a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;
an auxiliary magnetic pole layer having one end portion being adjacent to one end portion of said main magnetic pole layer and the other end portion connected magnetically with the other end portion of said main magnetic pole layer; and
at least one coil layer formed in such a way as to pass through between said main magnetic pole layer and said auxiliary magnetic pole layer for inducing a magnetic flux in said main magnetic pole layer and said auxiliary magnetic pole layer,
a curvature width $W_C$ of a contour line of said write field adjacent to a trailing edge on an air bearing surface side of said main magnetic pole layer satisfying the following expression:

$-0.15*W_T \leq W_C < 12$ where $W_T$ is a track width and a unit of $W_C$ and $W_T$ is nanometer; and
a support structure for supporting said thin-film magnetic head.

28. The head gimbal assembly as claimed in claim 27, wherein said contour line of said write field has a straight line shape or an almost straight line shape extending in said track-width direction.

29. The head gimbal assembly as claimed in claim 27, wherein said thin-film magnetic head further comprises a magnetoresistive read head element for reading signals, and said contour line of said write field has a concave shape that is curved toward a leading side in a center portion in said track-width direction and has a negative curvature width corresponding to a curvature that equals or nearly equals a curvature of a magnetic sensitivity contour of said magnetoresistive read head element during reading signals.

30. The head gimbal assembly as claimed in claim 27, wherein said main magnetic pole layer comprises a main pole center layer and at least one main pole soft-magnetic layer that is formed in such a way as to cover both side end surfaces in said track-width direction and a leading end surface of said main pole center layer.

31. The head gimbal assembly as claimed in claim 27, wherein an inner saturation magnetic flux density of said main magnetic pole layer is varied continuously from said both side end surfaces and said leading end surface, toward said center portion of said trailing end surface.

32. A head gimbal assembly comprising:
a thin-film magnetic head comprising at least one inductive write head element comprising:
a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;
an auxiliary magnetic pole layer having one end portion being adjacent to one end portion of said main magnetic pole layer and the other end portion connected magnetically with the other end portion of said main magnetic pole layer; and
at least one coil layer formed in such a way as to pass through between said main magnetic pole layer and said auxiliary magnetic pole layer for inducing a magnetic flux in said main magnetic pole layer and said auxiliary magnetic pole layer,
a slope $\alpha$ of a regression line obtained by least square method of a distribution of said inner saturation magnetic flux density under a condition that a positive direction of position coordinate is defined as a direction from said both side end surfaces and said leading end surface toward said center portion of said trailing end surface, satisfying the following expression:

$-(0.000157*W_T+0.0126) \leq \alpha < 0$ where a unit of $\alpha$ is Tesla/nm, $W_T$ is a track width, and a unit of $W_C$ and $W_T$ is nanometer; and
a support structure for supporting said thin-film magnetic head.

33. The head gimbal assembly as claimed in claim 32, wherein said main magnetic pole layer comprises a main pole center layer and at least one main pole soft-magnetic layer that is formed in such a way as to cover both side end surfaces in said track-width direction and a leading end surface of said main pole center layer.

34. The head gimbal assembly as claimed in claim 32, wherein an inner saturation magnetic flux density of said main magnetic pole layer is varied continuously from said both side end surfaces and said leading end surface, toward said center portion of said trailing end surface.

35. A magnetic disk drive apparatus comprising:
at least one head gimbal assembly comprising:
a thin-film magnetic head comprising at least one inductive write head element comprising:
a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;
an auxiliary magnetic pole layer having one end portion being adjacent to one end portion of said main magnetic pole layer and the other end portion connected magnetically with the other end portion of said main magnetic pole layer; and
at least one coil layer formed in such a way as to pass through between said main magnetic pole layer and said auxiliary magnetic pole layer for inducing a magnetic flux in said main magnetic pole layer and said auxiliary magnetic pole layer,
a curvature width $W_C$ of a contour line of said write field adjacent to a trailing edge on an air bearing surface side of said main magnetic pole layer satisfying the following expression:

$$-0.15*W_T \leq W_C < 12$$

where $W_T$ is a track width and a unit of $W_C$ and $W_T$ is nanometer; and
a support structure for supporting said thin-film magnetic head; and
at least one magnetic disk; and
a recording/reproducing control means for controlling read and write operations of said thin-film magnetic head to said at least one magnetic disk.

36. The magnetic disk drive apparatus as claimed in claim 35, wherein said contour line of said write field has a straight line shape or an almost straight line shape extending in said track-width direction.

37. The magnetic disk drive apparatus as claimed in claim 35, wherein said thin-film magnetic head further comprises a magnetoresistive read head element for reading signals, and said contour line of said write field has a concave shape that is curved toward a leading side in a center portion in said track-width direction and has a negative curvature width corresponding to a curvature that equals or nearly equals a curvature of a magnetic sensitivity contour of said magnetoresistive read head element during reading signals.

38. The magnetic disk drive apparatus as claimed in claim 35, wherein said main magnetic pole layer comprises a main pole center layer and at least one main pole soft-magnetic layer that is formed in such a way as to cover both side end surfaces in said track-width direction and a leading end surface of said main pole center layer.

39. The magnetic disk drive apparatus as claimed in claim 35, wherein an inner saturation magnetic flux density of said main magnetic pole layer is varied continuously from said both side end surfaces and said leading end surface, toward said center portion of said trailing end surface.

40. A magnetic disk drive apparatus comprising:
at least one head gimbal assembly comprising:
a thin-film magnetic head comprising at least one inductive write head element comprising:
a main magnetic pole layer having an inner saturation magnetic flux density varying from both side end surfaces in a track-width direction and a leading end surface of said main magnetic pole layer, toward a center portion in said track-width direction of a trailing end surface of said main magnetic pole layer, for generating a write field;
an auxiliary magnetic pole layer having one end portion being adjacent to one end portion of said main magnetic pole layer and the other end portion connected magnetically with the other end portion of said main magnetic pole layer; and
at least one coil layer formed in such a way as to pass through between said main magnetic pole layer and said auxiliary magnetic pole layer for inducing a magnetic flux in said main magnetic pole layer and said auxiliary magnetic pole layer,
a slope $\alpha$ of a regression line obtained by least square method of a distribution of said inner saturation magnetic flux density under a condition that a positive direction of position coordinate is defined as a direction from said both side end surfaces and said leading end surface toward said center portion of said trailing end surface, satisfying the following expression:

$$-(0.000157*W_T+0.0126) \leq \alpha < 0$$

where a unit of $\alpha$ is Tesla/nm, $W_T$ is a track width, and a unit of $W_C$ and $W_T$ is nanometer; and
a support structure for supporting said thin-film magnetic head; and
at least one magnetic disk; and
a recording/reproducing control means for controlling read and write operations of said thin-film magnetic head to said at least one magnetic disk.

41. The magnetic disk drive apparatus as claimed in claim 40, wherein said main magnetic pole layer comprises a main pole center layer and at least one main pole soft-magnetic layer that is formed in such a way as to cover both side end surfaces in said track-width direction and a leading end surface of said main pole center layer.

42. The magnetic disk drive apparatus as claimed in claim 40, wherein an inner saturation magnetic flux density of said main magnetic pole layer is varied continuously from said both side end surfaces and said leading end surface, toward said center portion of said trailing end surface.

* * * * *